United States Patent
Bespalov et al.

(10) Patent No.: US 8,030,938 B2
(45) Date of Patent: Oct. 4, 2011

(54) APPARATUS AND METHOD FOR IMAGING SUBSURFACE MATERIALS USING A PAD HAVING A PLURALITY OF ELECTRODE SETS

(75) Inventors: Alexandre N. Bespalov, Spring, TX (US); David R. Beard, Houston, TX (US); Randy Gold, Houston, TX (US); Gregory B. Itskovich, Houston, TX (US); Tsili Wang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 772 days.

(21) Appl. No.: 12/055,517

(22) Filed: Mar. 26, 2008

(65) Prior Publication Data

US 2009/0243619 A1    Oct. 1, 2009

(51) Int. Cl.
*G01V 3/18* (2006.01)
(52) U.S. Cl. ........................................ 324/367
(58) Field of Classification Search .................... 324/367
See application file for complete search history.

(56) References Cited

U.S. PATENT DOCUMENTS

| 3,462,678 | A | * | 8/1969 | Eaton | 324/367 |
| 5,852,363 | A | * | 12/1998 | Smits | 324/373 |
| 6,191,588 | B1 | | 2/2001 | Chen | |
| 2004/0245991 | A1 | | 12/2004 | Hayman et al. | |
| 2006/0066313 | A1 | * | 3/2006 | Homan et al. | 324/343 |
| 2008/0315884 | A1 | * | 12/2008 | Bittar et al. | 324/366 |

FOREIGN PATENT DOCUMENTS

| WO | 0177710 A1 | 10/2001 |
| WO | 0177711 A1 | 10/2001 |

OTHER PUBLICATIONS

International Search Report for International Application No. PCT/US2009/038267. Mailed Nov. 11, 2009.
Written Opinion of the International Searching Authority for International Application No. PCT/US2009/038267. Mailed Nov. 11, 2009.
Cheung, Philip; Hayman, Andrew; Laronga, Rob; Cook, Greg; Flournoy, Greg; Goetz, Peter; Hansen, Steve; Lamb, Malcolm; Li, Bingjian; Larsen, Mark; Orgren, Mark; and Redden, Jim (Schlumberger et al). A Clear Picture in Oil-Base Muds. Oilfield Review, Winter 2001/ 2002, V. 13, No. 4.

* cited by examiner

*Primary Examiner* — Jay Patidar
(74) *Attorney, Agent, or Firm* — Cantor Colburn LLP

(57) ABSTRACT

An apparatus for imaging a subsurface material traversed by a borehole, the apparatus including an imaging pad deployed by a logging instrument, the pad including a plurality of measuring sets, each measuring set including a first current injector electrode, a second current injector electrode, a pair of sensor electrodes disposed between the first current injector electrode and the second current injector electrode, and an output for coupling to an electronics unit adapted for producing the imaging of the subsurface material.

20 Claims, 22 Drawing Sheets

Top view

Side View

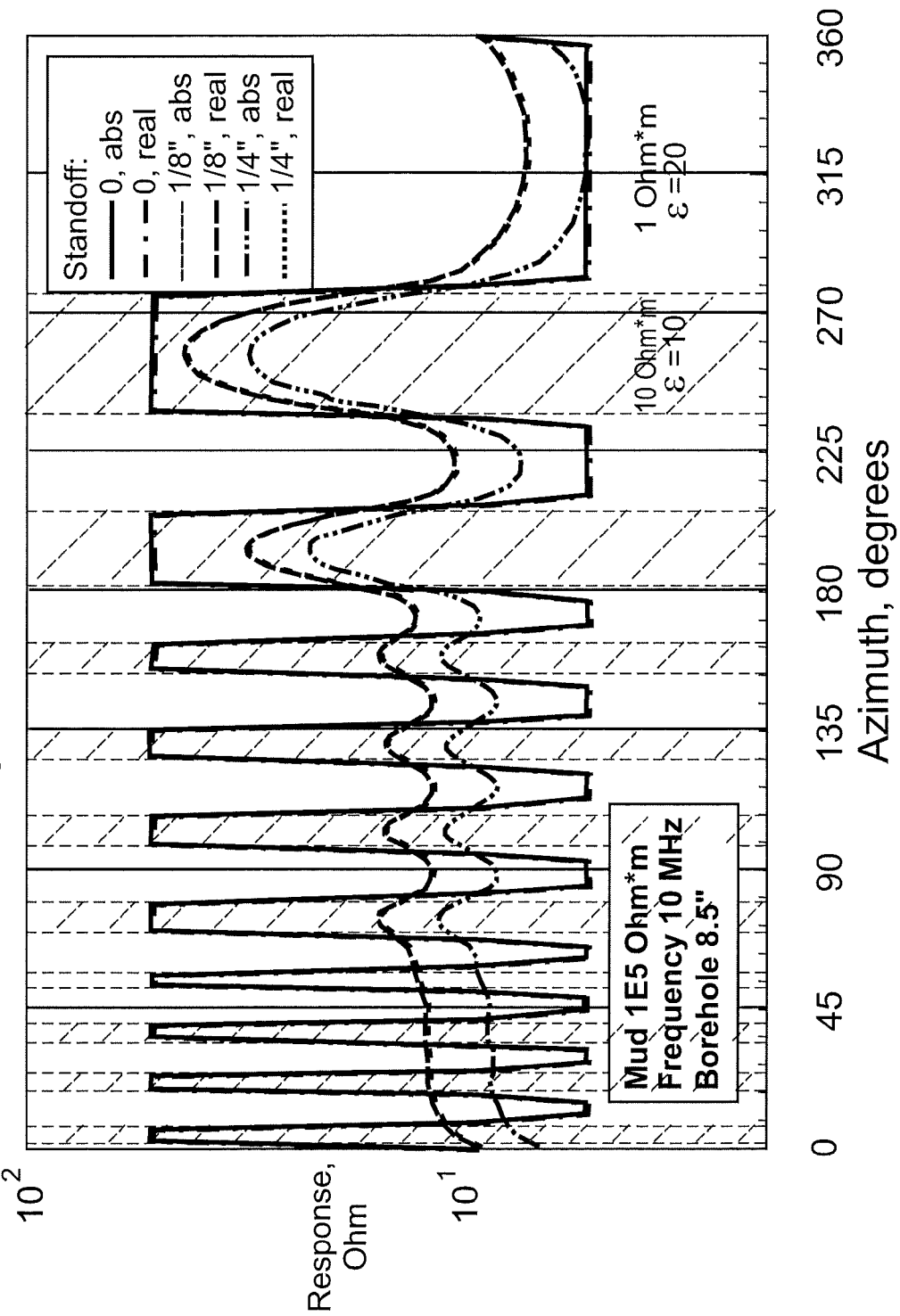

FIG.. 12
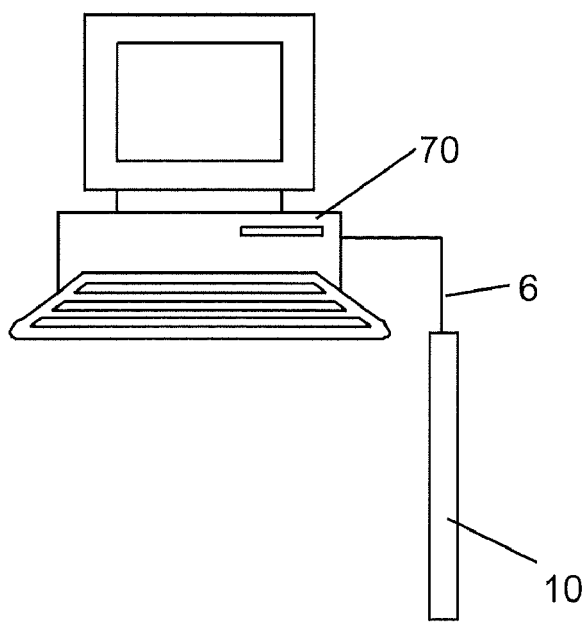
FIG.. 13
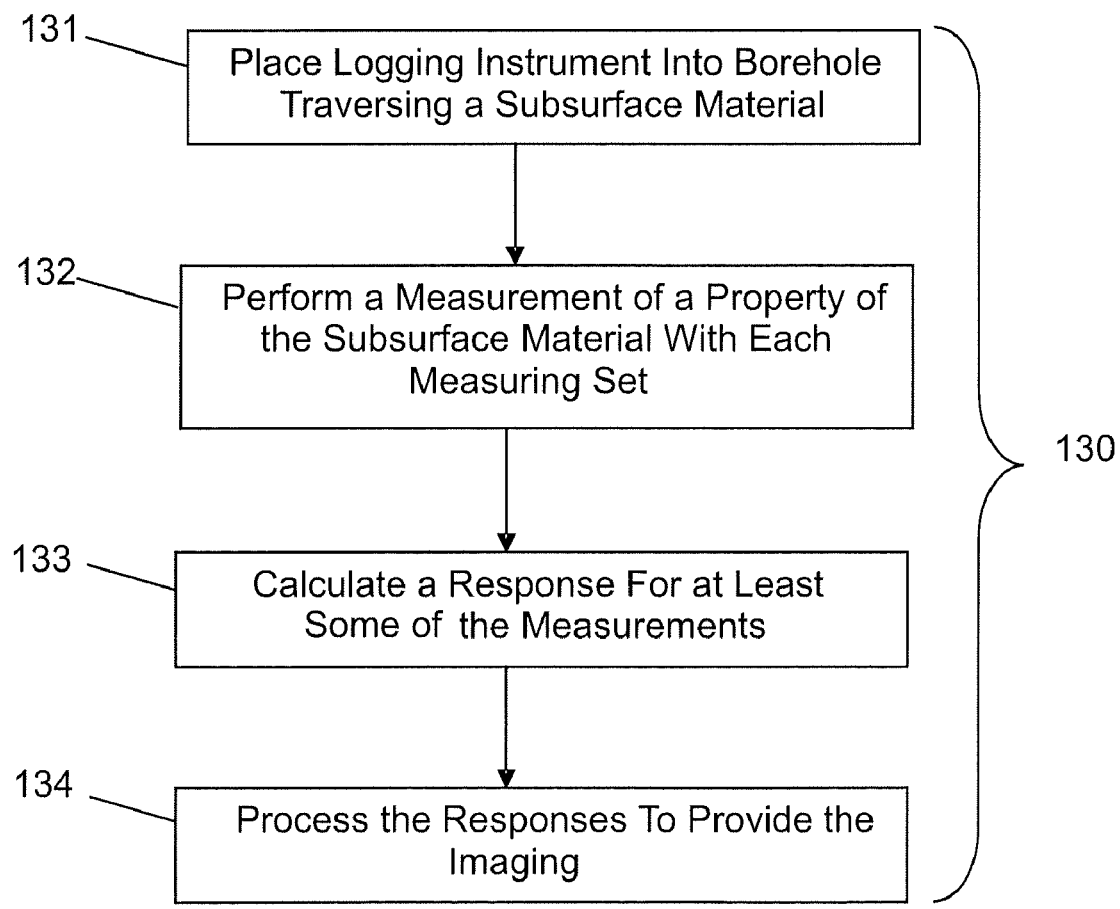

APPARATUS AND METHOD FOR IMAGING SUBSURFACE MATERIALS USING A PAD HAVING A PLURALITY OF ELECTRODE SETS

BACKGROUND OF THE INVENTION

1. Field of the Invention

The invention disclosed herein relates to imaging a subsurface material from a borehole.

2. Description of the Related Art

In exploration for hydrocarbons, it is important to make accurate measurements of various properties of geologic formations. In particular, it is important to determine the various properties with a high degree of accuracy so that drilling resources are used efficiently.

Generally, oil and gas are accessed by drilling boreholes into the subsurface of the earth. The boreholes also provide access for taking measurements of the geologic formations.

Well logging is a technique used to take measurements of the geologic formations from the boreholes. In one embodiment, a "logging instrument" is lowered on the end of a wireline into a borehole. The logging instrument sends data via the wireline to the surface for recording. Output from the logging instrument comes in various forms and may be referred to as a "log." The log generally includes measurements performed at different depths.

Many types of measurements are made from the borehole to obtain information about the geologic formations. One important measurement is resistivity of the geologic formation. Using resistivity data, an image of the formation can be formed. The resistivity log can be used by geophysicists to determine important characteristics of the formation such as the ability of the formation to contain a reservoir of hydrocarbons.

One type of logging instrument used for measuring resistivity is referred to as a "four-terminal resistivity imager," FIG. 1 illustrates a four-terminal resistivity imager 99 as is known in the prior art. FIG. 1A illustrates a side view of the imager 99 that is used for imaging a formation layer 97 in a geologic formation 98. FIG. 1B illustrates a front view of the imager 99. Referring to FIG. 1A, the imager 99 includes an upper current injector electrode 91 and a lower current injector electrode 92. The electrodes 91 and 92 are used to conduct electric current (I) 94 through the formation 98 and the formation layer 97. The electric current 94 is supplied by an electric source 95 and measured by an ammeter 96.

Referring to FIG. 1B, the imager 99 includes a plurality of button-sensor pairs 90 where each button-sensor pair 90 includes an upper button-sensor electrode 88 and a lower button-sensor electrode 89. The plurality of button-sensor pairs 90 is disposed between the upper button-sensor electrode 91 and the lower button-sensor electrode 92. Each button-sensor pair 90 is used to measure a formation voltage (Vi) 87.

Referring to FIG. 1A, the imager 99 includes a metal shield 86 used to shield the measurements of formation voltage 87 from the direct electric field created by the voltage between the electrodes 91 and 92.

Referring to FIG. 1B, the distance between the upper edge of the upper current injector electrode 91 and the lower edge of the lower current injector electrode 92 is 14.5 inches. The center-to-center distance between the upper button-sensor 88 and the lower button-sensor 89 is 10 mm.

The response of the imager 99 for the i-th button sensor pair 90 is defined as Vi/I.

The four-terminal resistivity imager 99 of FIG. 1 has a drawback. The drawback is that the imager 99 has little or no azimuthal resolution. "Azimuthal resolution" in this application is related to discerning changes in resistivity in the formation 98 with respect to changes of radial direction from the borehole when the borehole is viewed from above.

Therefore, what are needed are techniques to measure resistivity of a formation from a borehole wherein the resistivity measurements have high azimuthal resolution.

BRIEF SUMMARY OF THE INVENTION

Disclosed is an embodiment of an apparatus for imaging a subsurface material traversed by a borehole, the apparatus including an imaging pad deployed by a logging instrument, the pad including a plurality of measuring sets, each measuring set including a first current injector electrode, a second current injector electrode, a pair of sensor electrodes disposed between the first current injector electrode and the second current injector electrode, and an output for coupling to an electronics unit adapted for producing the imaging of the subsurface material.

Also disclosed is one example of a method for imaging a subsurface material from a borehole traversing the subsurface material, the method including: placing a logging instrument in the borehole, the logging instrument including an imaging pad that includes a plurality of measuring sets, each measuring set including a first current injector electrode, a second current injector electrode, and a pair of sensor electrodes disposed between the first current injector electrode and the second current injector electrode; performing a measurement of a property of the subsurface material with each measuring set; calculating a response for at least some of the measurements; and processing the responses to provide the imaging.

Further disclosed is an embodiment of a computer program product stored on machine-readable media, the product including machine-executable instructions for imaging a subsurface material traversed by a borehole, the product including instructions for: performing a measurement of a property of the subsurface material with each measuring set of a logging instrument that includes an imaging pad having a plurality of measuring sets, each measuring set including a first current injector electrode, a second current injector electrode, and a sensor electrode pair disposed between the first current injector electrode and the second current injector electrode; recording the measurements; calculating a response for at least some of the measurements; and processing the responses to provide the imaging.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIGS. 6A-6D, collectively, referred to as FIG. 6, present responses from the logging instrument from a numerical simulation with the azimuthal benchmark and an operational frequency of 10 MHz;

FIG. 12 illustrates an exemplary embodiment of a computer coupled to the logging instrument; and FIG. 13 presents one example of a method for imaging a subsurface material traversed by the borehole.

DETAILED DESCRIPTION OF THE INVENTION

The teachings provide techniques for imaging a formation from a borehole. The techniques provide embodiments of apparatus and a method for measuring a property of the formation (such as resistivity) with high azimuthal resolution to provide an image of the formation with high azimuthal resolution.

The techniques call for apparatus that includes a plurality of current injector electrode pairs and a plurality of button-sensor pairs. In the apparatus, each button-sensor electrode pair is disposed between a pair of current injector electrodes. One current injector electrode pair and one associated button-sensor electrode pair is referred to as a "measurement set." Use of a plurality of measurement sets on an imaging pad provides for measurements of resistivity with high azimuthal resolution. The teachings are applicable to wireline logging and logging-while-drilling (LWD) applications.

Figure 1:
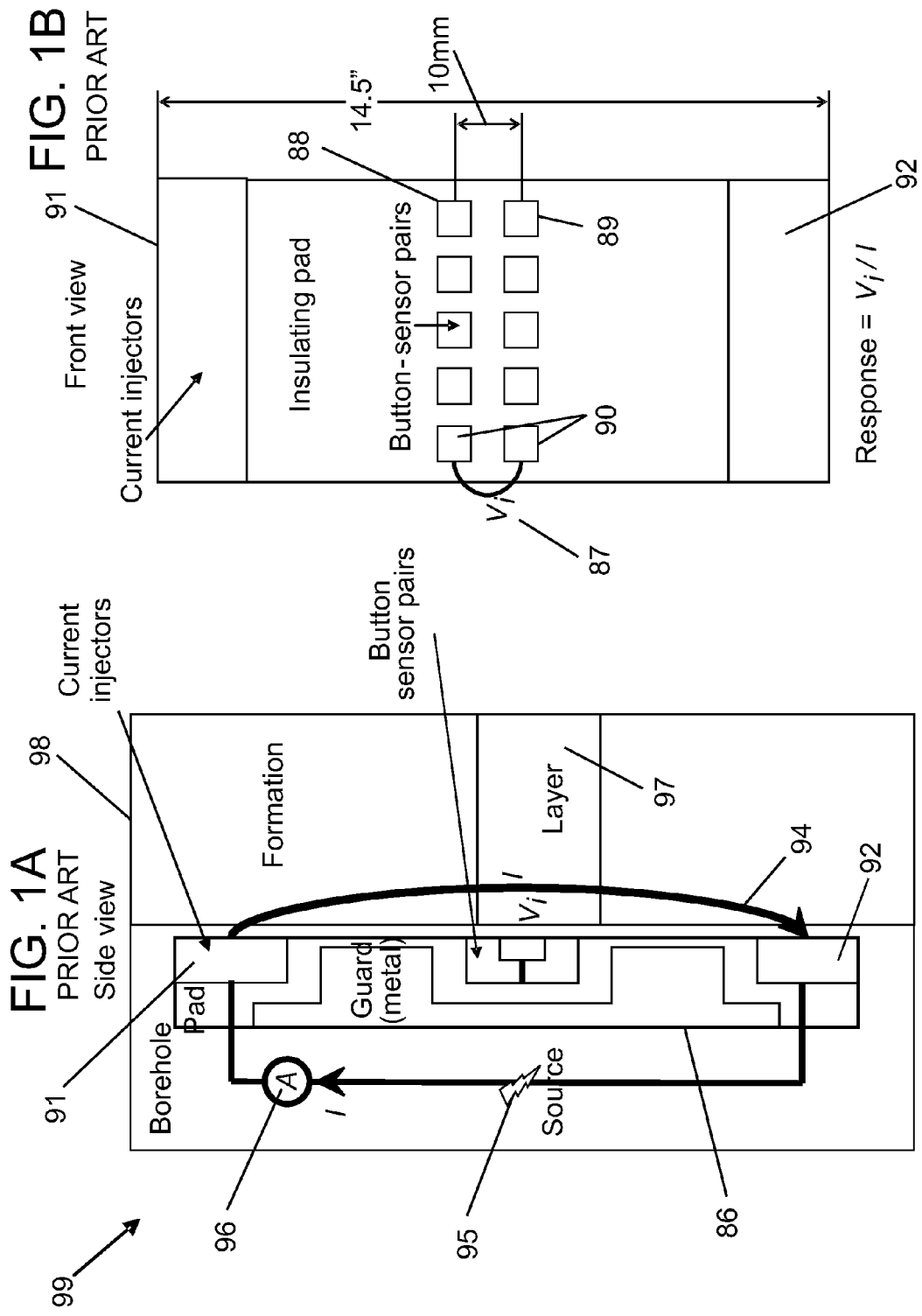
FIGS. 1A, and 1B, collectively referred to as FIG. 1, illustrate aspects of a four-terminal imager used in the prior art.
Figure 2:
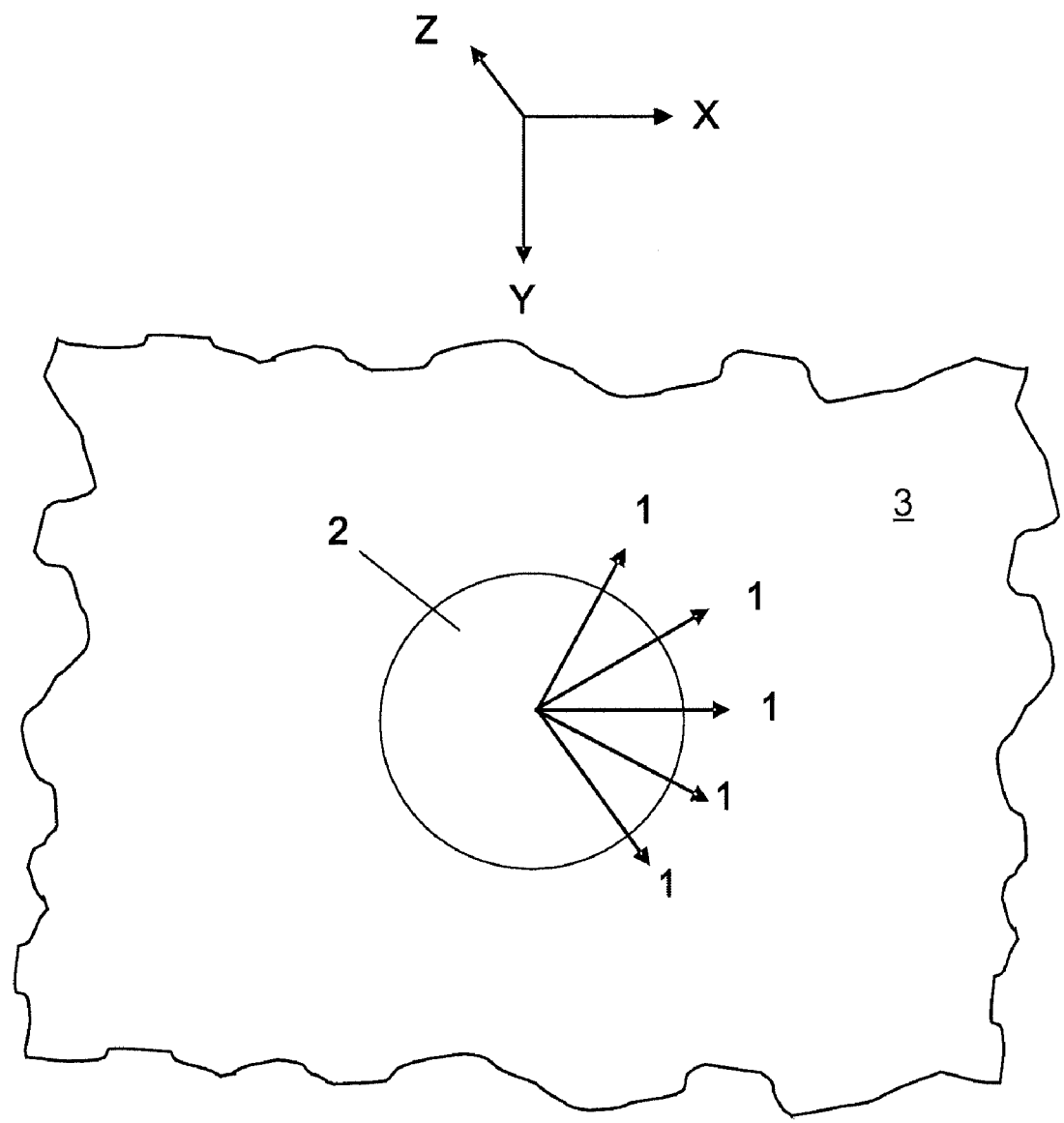
FIG. 2 illustrates an exemplary embodiment of a borehole for depicting aspects of azimuthal resolution.

Certain definitions are provided for convenience. The term "azimuthal resolution" relates to discerning changes in resistivity of the formation with respect to changes in direction locating portions of the formation from a borehole when the borehole is viewed from above. FIG. 2 illustrates an embodiment of a borehole 2 viewed from above for depicting aspects of azimuthal resolution. The borehole 2 penetrates formation 3. Illustrated in FIG. 2 are directions 1. A resistivity measurement of a portion of the formation 3 may depend on the direction 1 that locates the portion. Therefore, a high azimuthal resolution imager can discern changes in resistivity in different portions of the formation 3 as the direction 1 changes. The term "standoff" relates to a distance between the imaging pad and the wall of the borehole. The term "subsurface material" makes reference to any material that may be assessed using a downhole instrument. The term "pad" relates to a structure which includes electrodes for at least one measuring set. For LWD applications, the pad can be a drill collar or included in the drill collar.

Figure 3:
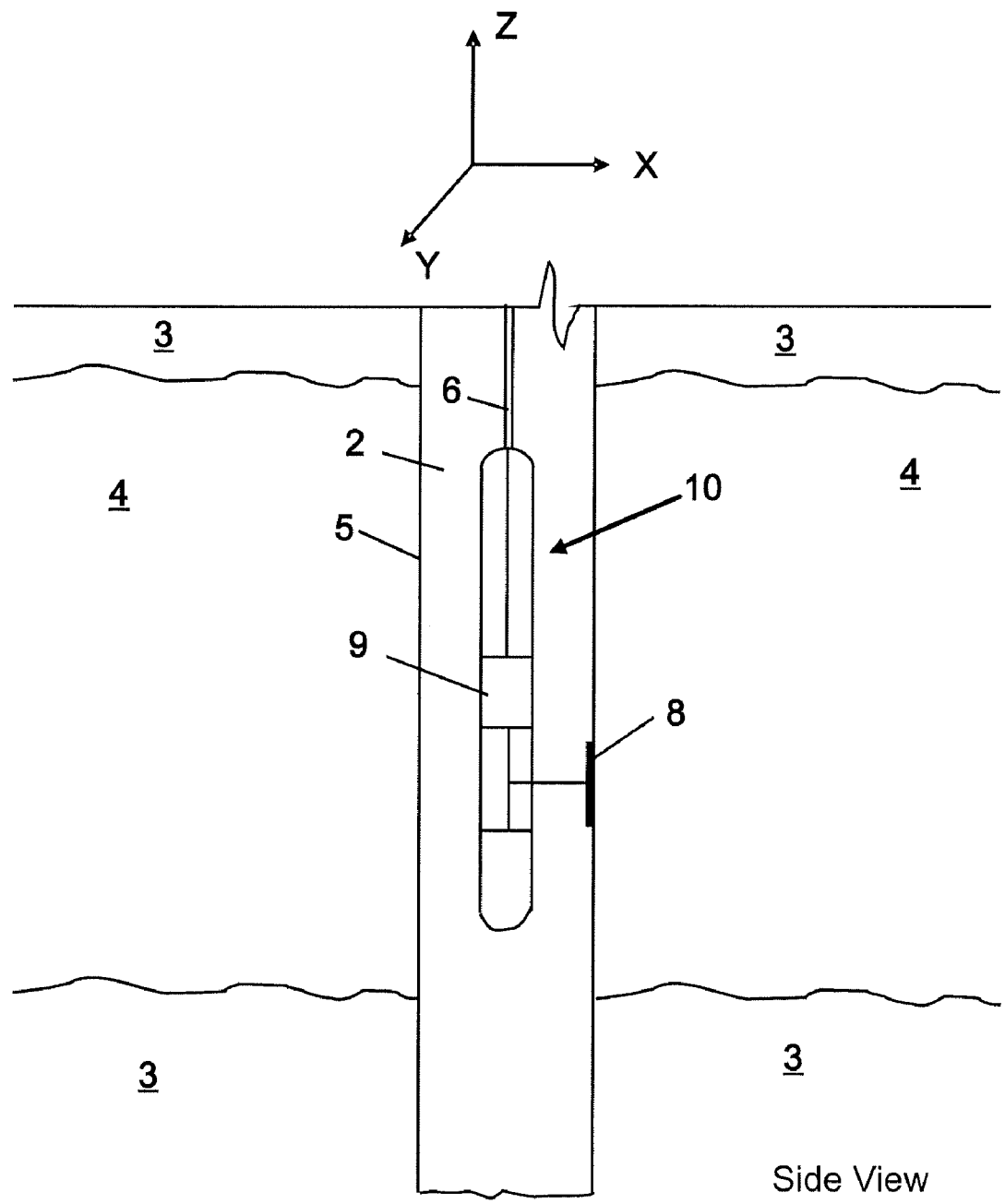
FIG. 3 illustrates an exemplary embodiment of a logging instrument in the borehole penetrating the earth.

Referring now to FIG. 3, an embodiment of a logging instrument 10 is shown disposed in the borehole 2 traversing the formation 3 that includes a layer 4. The borehole 2 includes a borehole wall 5 that is circular when viewed from above. The logging instrument 10 includes a high azimuthal resolution resistivity imaging pad 8 and an electronics unit 9 for at least one of processing data from the imaging pad 8 and operating the imaging pad 8. The logging instrument 10 is supported in the borehole 2 by wireline 6. While the embodiment of FIG. 3 depicts the borehole 2 traversing the formation 3, the borehole 2 can also traverse subsurface material, which may be imaged by the instrument 10.

In typical embodiments, the borehole 2 includes materials such as would be found in oil exploration, including a mixture of liquids such as water, drilling fluid, mud, oil, gases, and formation fluids as may be indigenous to the surroundings. One skilled in the art will recognize that the various geologic features as may be encountered in a subsurface environment may be referred to as "formations," and that the array of materials down the borehole (i.e., downhole) may be referred to as "sub-surface materials." That is, the formations are formed of sub-surface materials. Accordingly, as used herein, it should be considered that while the term "formation" generally refers to geologic formations of interest, and "sub-surface material," includes any materials of interest such as fluids, gases, liquids, and the like. A more detailed description of the high azimuthal resolution imaging pad 8 and the electronics unit 9 is provided next.

Figure 4B:
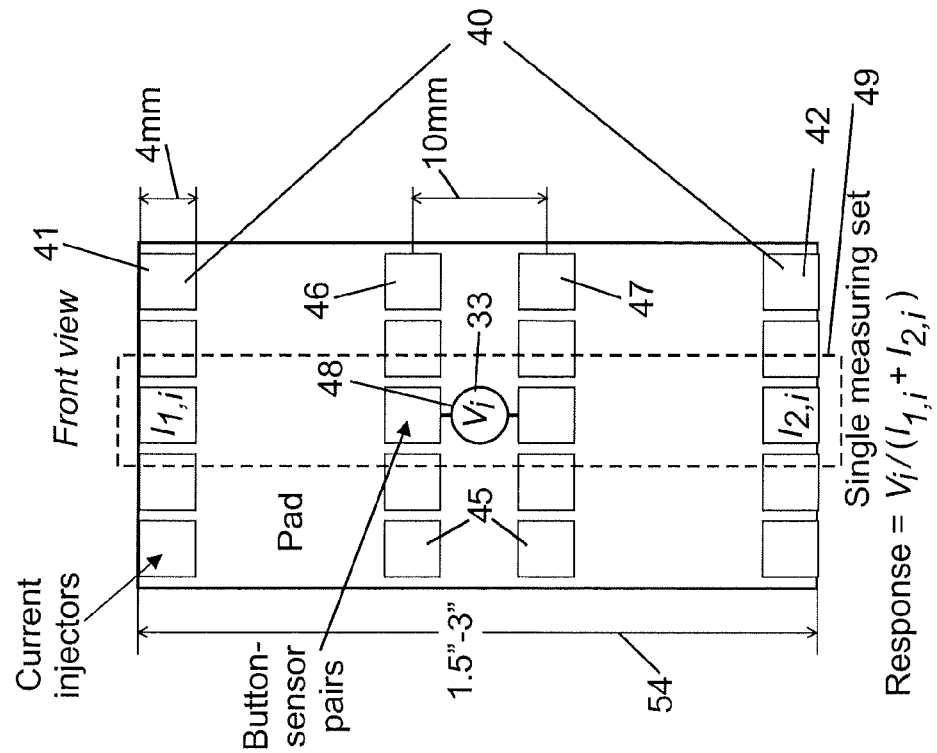
FIGS. 4A and 4B, collectively referred to as FIG. 4, illustrate an exemplary embodiment of a high azimuthal resolution resistivity imaging pad and an electronics unit.
Figure 4A:
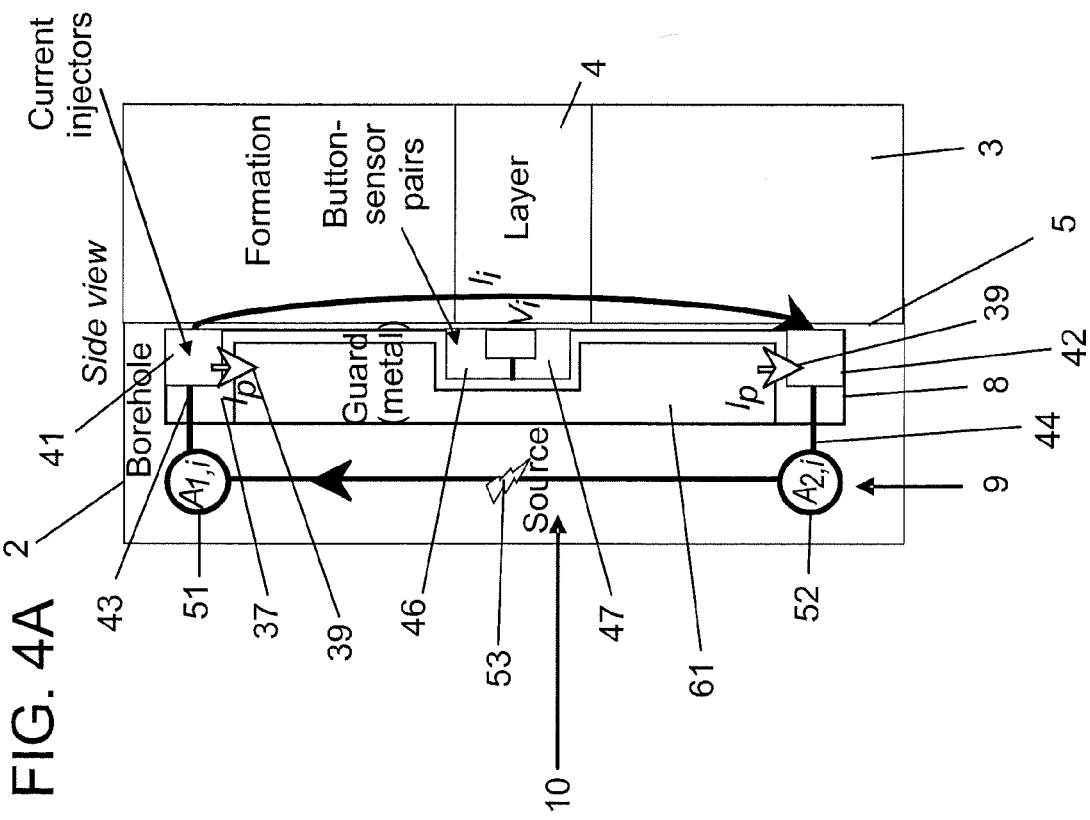
Figure 5A:
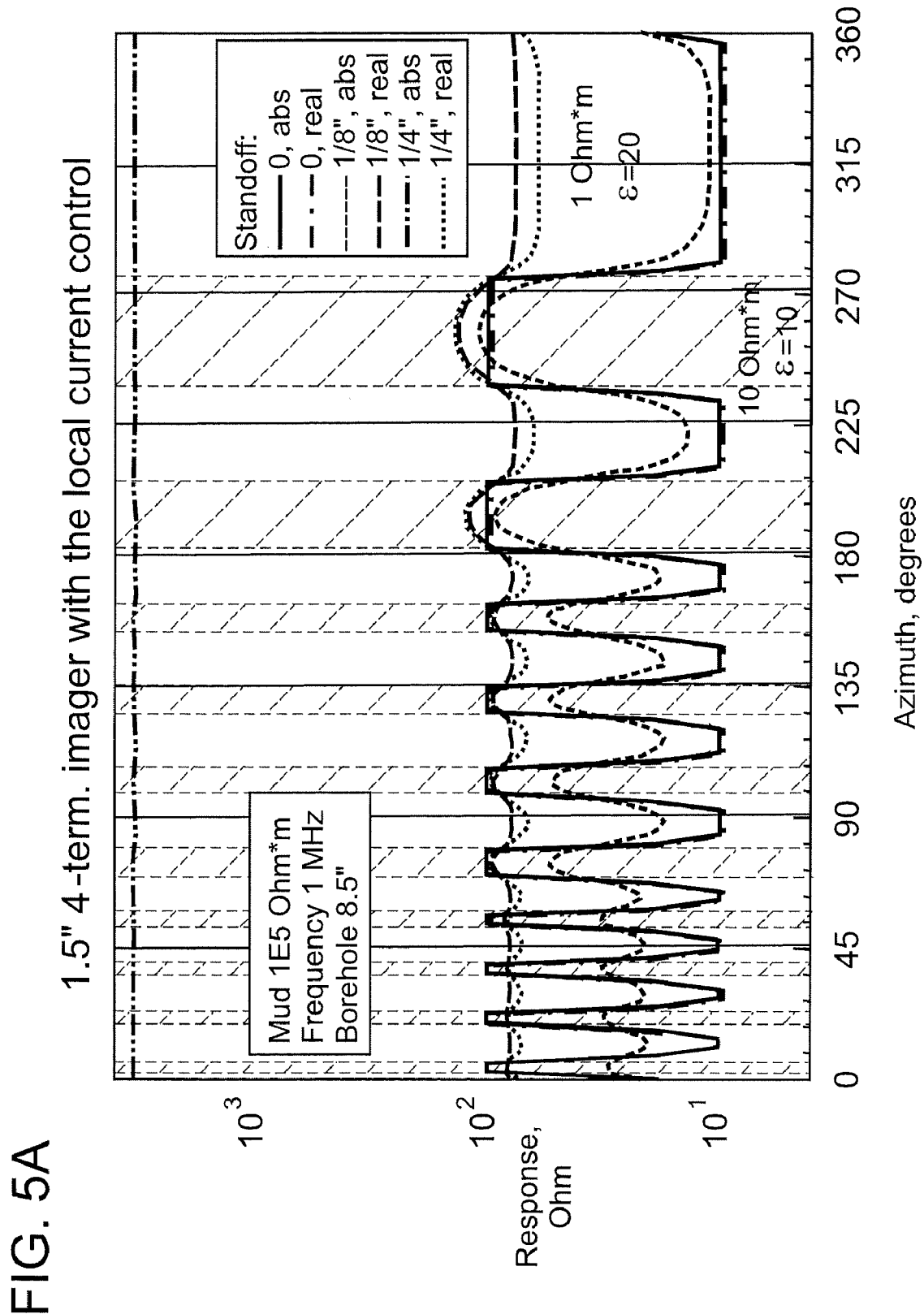
FIGS. 5A-5D, collectively, referred to as FIG. 5, present responses from the logging instrument from a numerical simulation with an azimuthal benchmark and an operational frequency of 1 MHz.
Figure 5B:
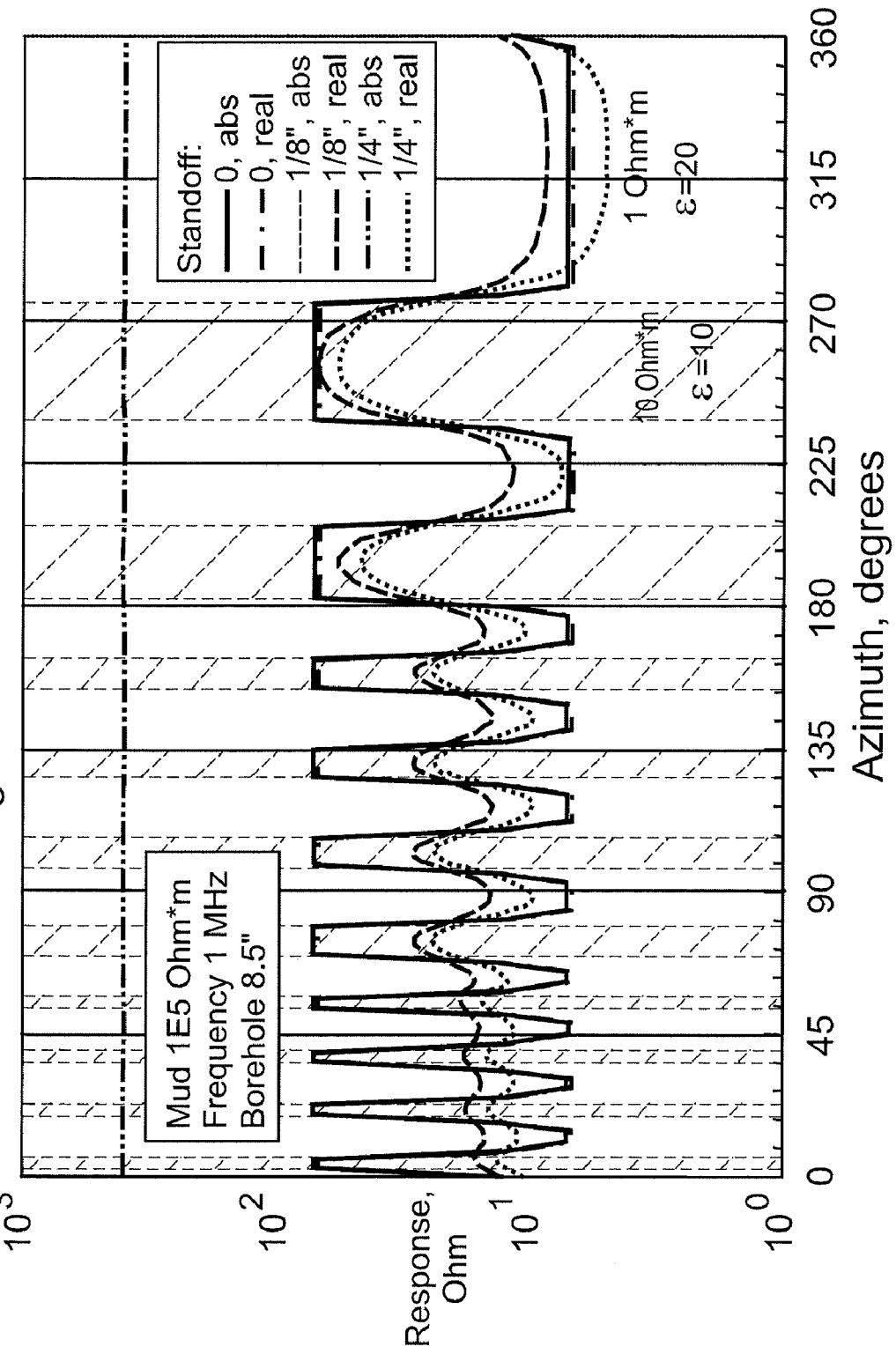
Figure 5C:
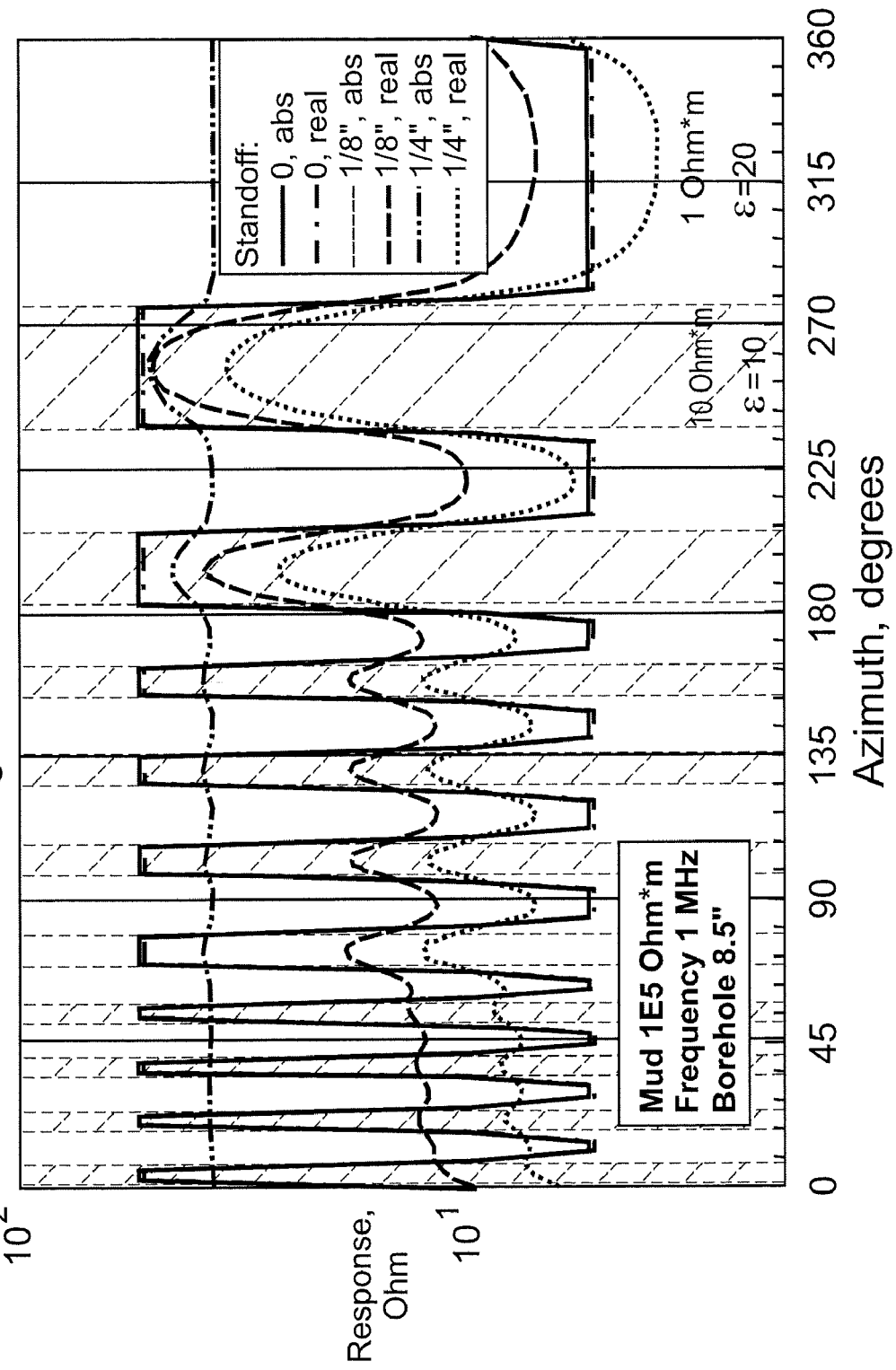
Figure 5D:
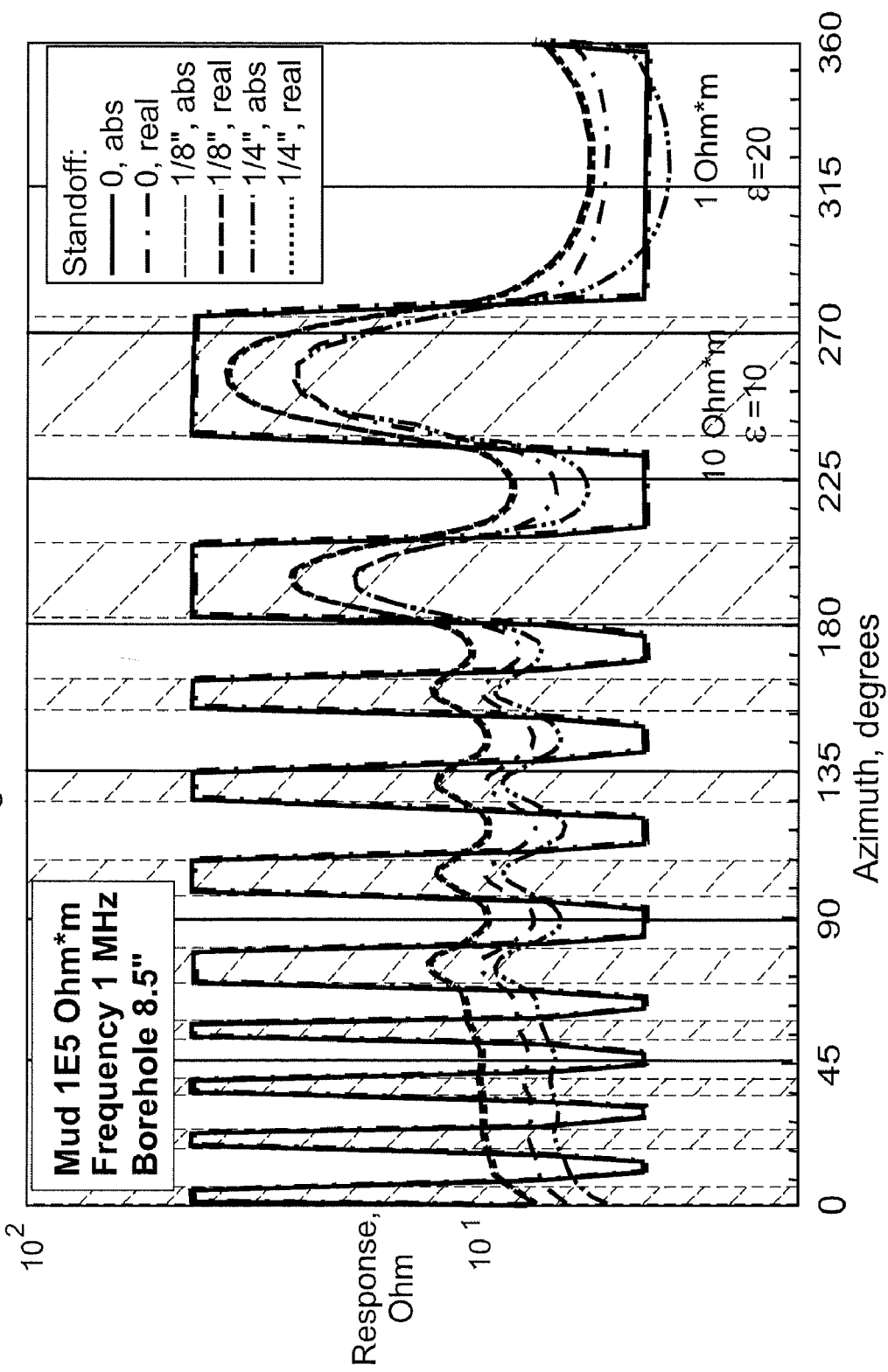

FIG. 4 illustrates an exemplary embodiment of the high azimuthal resolution imaging pad 8 and the electronics unit 9. In some embodiments, the electronics unit 9 may be included in the imaging pad 8. FIG. 4A illustrates a side view of the imaging pad 8 and the electronics unit 9 and FIG. 4B illustrates a front view of the imaging pad 8.

Referring to FIG. 4B, the imaging pad 8 includes a plurality of current injector electrode pairs 40. Each current injector electrode pair 40 includes a first current injector electrode 41 and a second current injector electrode 42. Each current injector electrode pair 40 injects electric current through the formation 3 and the layer 4. Because of the plurality of current injector electrode pairs 40, current in any first current injector 41 may not equal the current in the associated second current injector 42. For the i-th current injector electrode pair 40, a first electric current 43 in the first current injector electrode in designated $I_{1,i}$ and a second electric current 44 in the second current injector electrode 42 is designated $I_{2,i}$.

Also illustrated in FIG. 4B is a plurality of button-sensor electrode pairs 45. Each button-sensor electrode pair 45 includes a first button-sensor electrode 46 and a second button-sensor electrode 47. The button-sensor electrodes 46 and 47 are used to measure a voltage 48 derived from the electric current injected into the formation 3. The voltage 48 may be voltage in the formation 3 or, with non-zero standoff, voltage derived from the electric current injected into the formation 3. The voltage 48 measured by the i-th button-sensor pair 45 is designated $V_i$.

The response of the logging instrument 10 that includes the high azimuthal resolution imaging pad 8 is defined as $V_i/(I_{1,i}+I_{2,i})$. The response may also be referred to as "apparent impedance."

Each of the button-sensor electrode pairs 45 depicted in FIG. 4B are in line with a line defined by an associated current injector electrode pair 40. A combination of one button-sensor pair 45 and one associated current electrode injection pair 40 form a measuring set 49. The imaging pad 8 includes a plurality of measuring sets.

The measuring sets 49 provide for measuring resistivity with a high azimuthal resolution. Other factors may also govern the amount of azimuthal resolution as confirmed by numerical simulation. For example, one factor, in general, is a size of the electrodes in the current injector electrode pair 40 for non-zero pad 8 to borehole wall 5 standoff. Another factor is a distance between the first current injector electrode 41 and the second current injector electrode 42. The distance is measured from an outer edge to an outer edge as shown in FIG. 4B. Thus, the size of the electrodes in the current injector electrode pair 40 is smaller than size of the upper current injector electrode 91 and the lower current injector electrode 92 used in the prior art imager 99. Also, the distance between the first current injector electrode 41 and the second current injector electrode 42 in the logging instrument 10 is less than the distance between the upper current injector electrode 91 and the lower current injector electrode 92 in the prior art imager 99.

The smallest acceptable distance is limited by the penetration of the direct electric field, resulting from the voltage applied to the formation 3 by the current injector electrodes 41 and 42, into a voltage measurement zone for non-zero pad 8 to borehole wall 5 standoff. The voltage measurement zone is defined by each button-sensor electrode pair 45. Referring to FIG. 4A, the imaging pad 8 includes a first metal guard 61 for shielding the button-sensor electrode pairs 45 from the direct electric field.

Penetration of the direct electric field into the measurement zone is a parasitic phenomenon that exhibits itself by a presence of a reactive (i.e., imaginary) component of the response that is insensitive to the formation 3 or layer 4. The influence of the direct electric field on the response of the instrument 10 can vary depending on several factors. For example, the influence of the direct electric field increases with increasing standoff. As another example, the influence decreases as the distance between the first current injector electrode 41 and the second current electrode 42 increases. As another example, the influence decreases as the operating frequency of the instrument 10 increases. Thus, for the largest expected standoff, a choice in parameters of the instrument 10 is subject to the following tradeoff between:

a) an increase of the distance between the first current injector electrode 41 and the second current injector electrode 42 diminishes the influence of the direct electric field but deteriorates the azimuthal resolution; and b) an increase of the operating frequency also diminishes the influence of the direct electric field, but the increase is limited by electronic circuitry and the increase also boosts parasitic dielectric phenomena in resistive formations 4.

Referring to FIG. 4A, the electronics unit 9 includes a first ammeter 51 and a second ammeter 52. The first ammeter 51 measures the first electric current 43 and the second ammeter 52 measures the second electric current 44. The circuitry depicted in FIG. 4A is simplified and does not take into account that the first electric current 43 may not equal the second electric current 44. The electronic unit 9 depicted in FIG. 4A also includes a power source 53 that provides voltage and electric current to the current injector electrode pair 40 at an operational frequency. The electronic unit 9 includes a voltmeter 33 depicted in FIG. 4B for measuring the voltage 48 across the button-sensor electrodes 46 and 47 in each measuring set 49.

The response of the instrument 10 was validated by numerical simulation for the different parameters discussed above. The results of the numerical simulations are presented in FIGS. 5-8. Two benchmarks were used in the numerical simulations, a vertical benchmark and an azimuthal benchmark. Each benchmark includes alternating layers of one layer 4 (shown in white in FIGS. 5-8) with 1 ohm*m resistivity and a permittivity of 20 and another layer 4 (shown in grey or non-white in FIGS. 5-8) with 10 ohm*m resistivity and a permittivity of 10. Thicknesses of the alternating layers 4 were modeled at 0.5; 1; 2; 3; and 4 inches. The diameter of the borehole 2 was modeled at 8.5 inches. The resistivity of the drilling mud was modeled at $10^5$ ohm*m. The standoff between the imaging pad 8 and the borehole wall 5 was modeled at 0; ⅛; and ¼ inch. The operational frequency was modeled at 1 MHz, 10 MHz, and 40 MHz. A distance 54 between the first current injector electrode 41 and the second current electrode 42 (as measured from outer edge to outer edge as shown in FIG. 4B) was modeled at 1.5; 2; 2.5; and 3 inches.

FIG. 5, which includes FIGS. 5A-5D, presents responses of the instrument 10 for the azimuthal benchmark for an operational frequency of 1 MHz with current injector electrode distances of 1.5; 2; 2.5; and 3 inches.

Figure 6A:
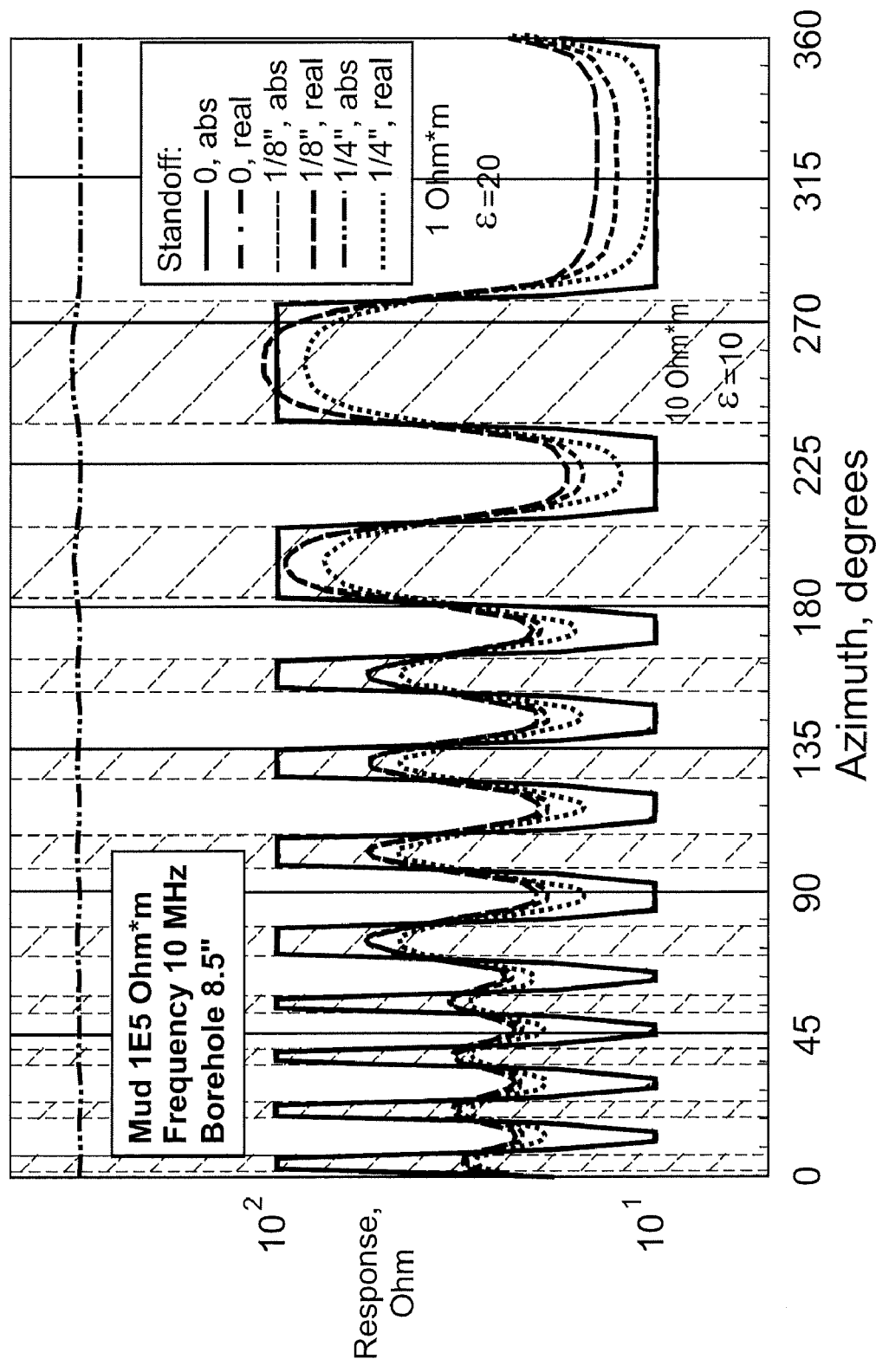
Figure 6B:
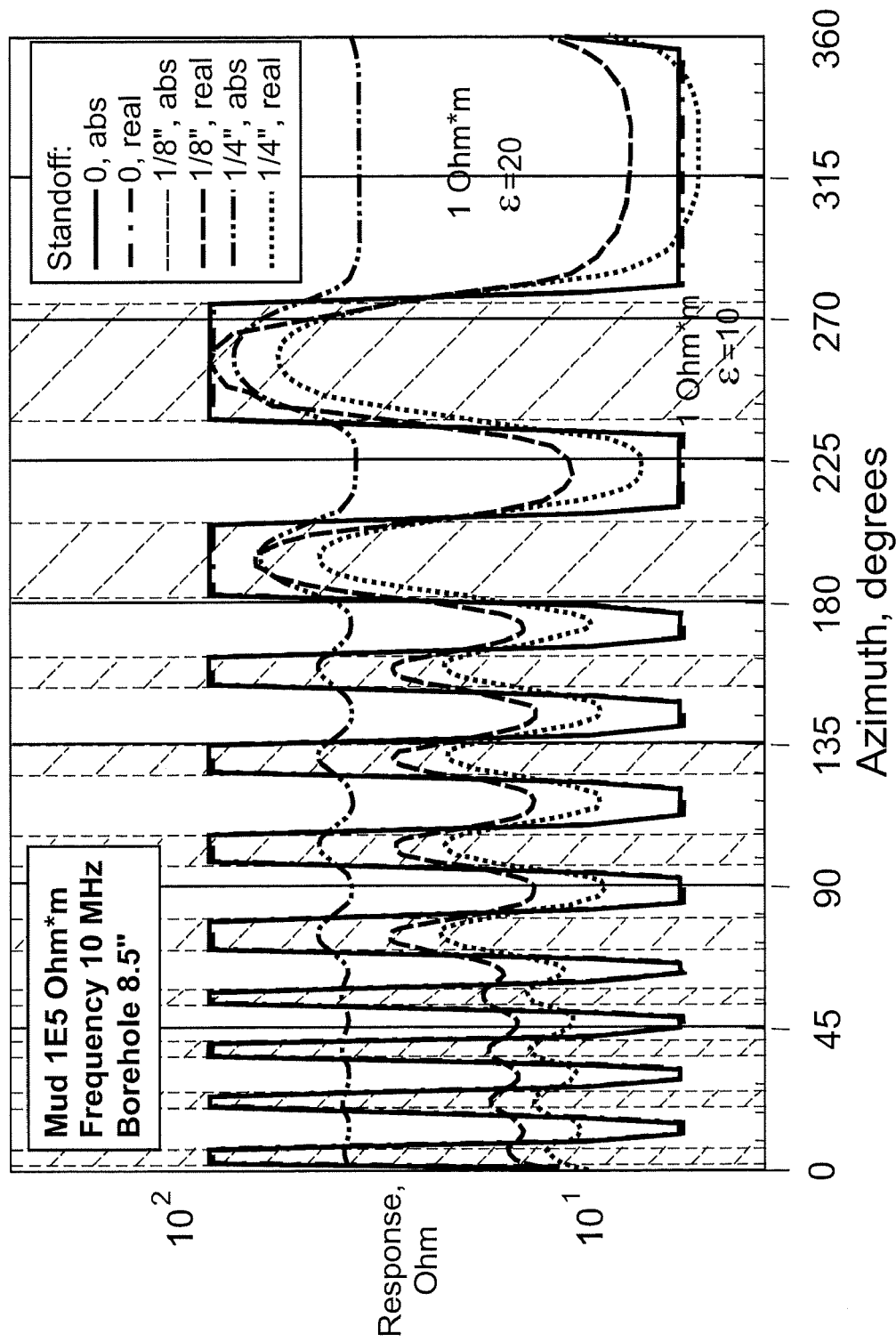
Figure 6C:
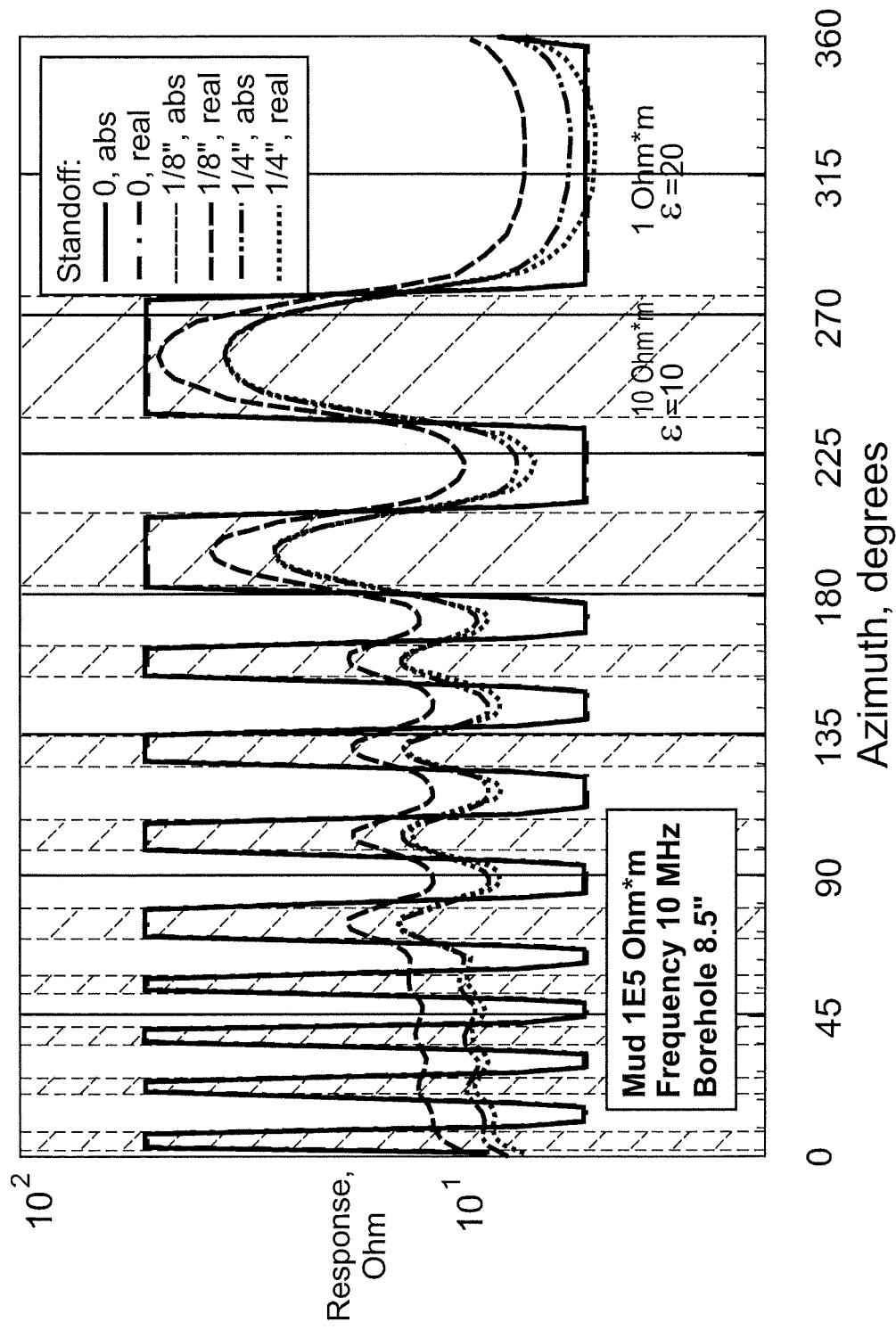

FIG. 6, which includes FIGS. 6A-6B, presents responses of the instrument 10 for the azimuthal benchmark for an operational frequency of 10 MHz with current injector electrode distances of 1.5; 2; 2.5; and 3 inches.

Figure 7A:
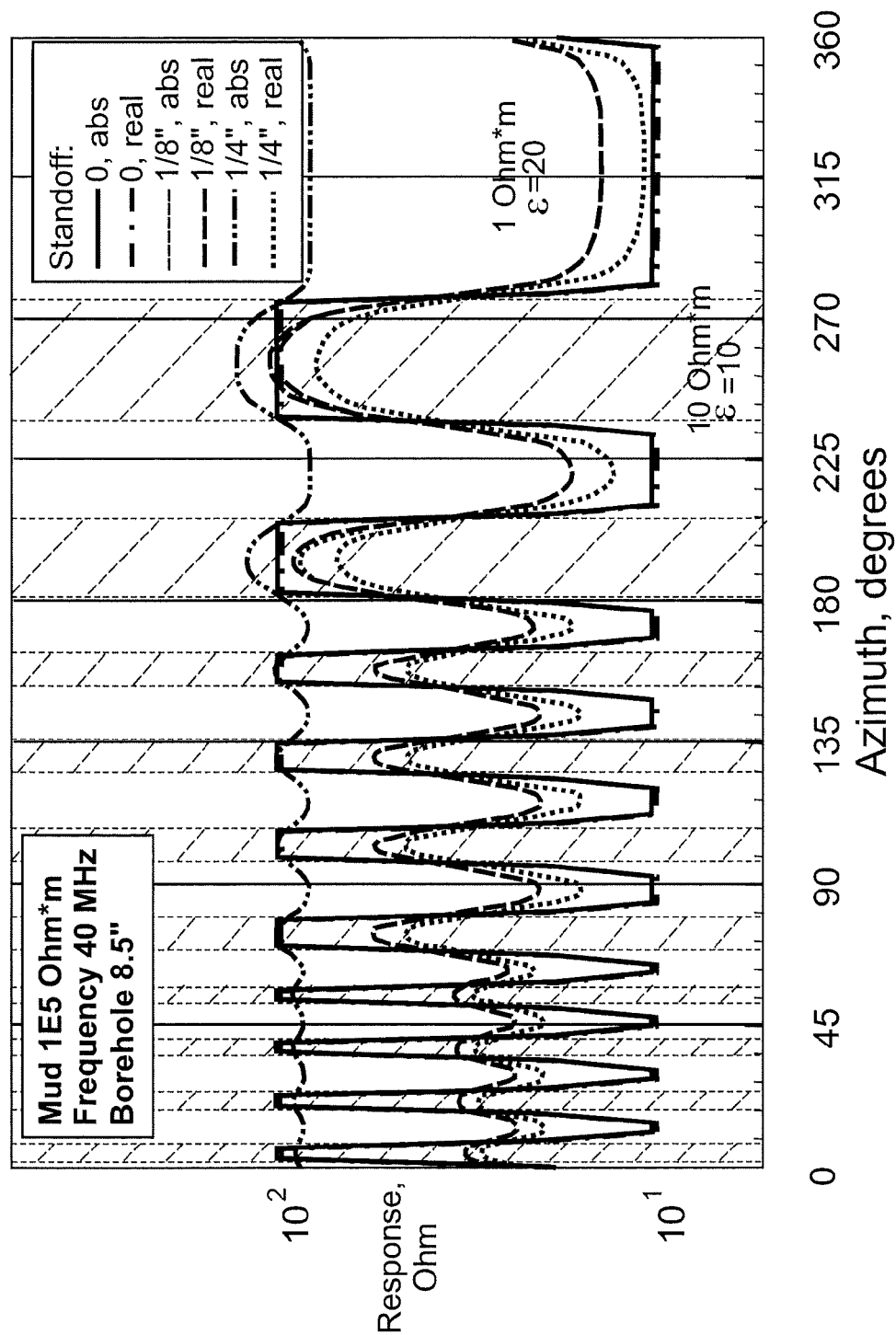
FIGS. 7A and 7B, collectively referred to as FIG. 7, present responses from the logging instrument from a numerical simulation with the azimuthal benchmark and an operational frequency of 40 MHz.
Figure 7B:
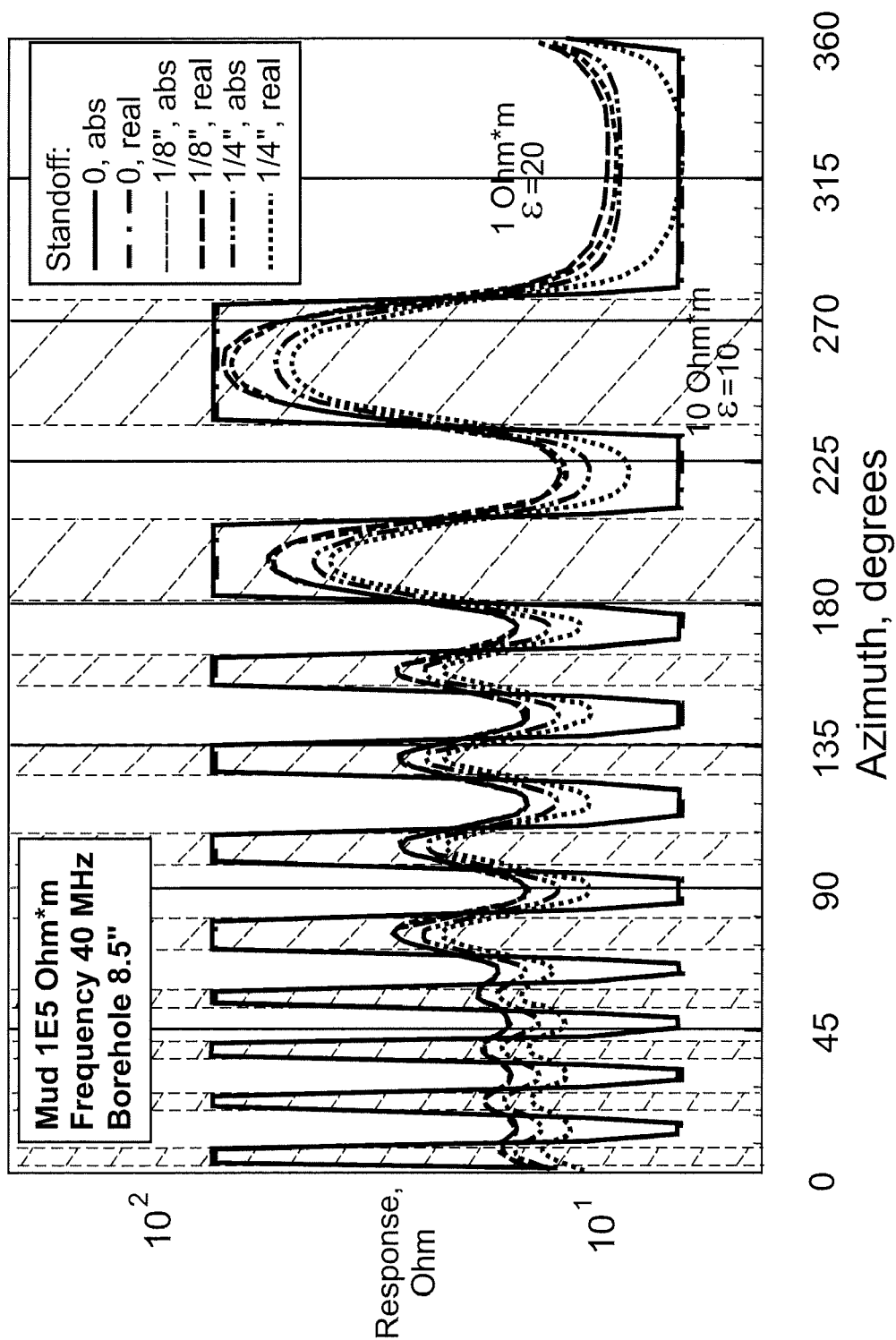
Figure 8A:
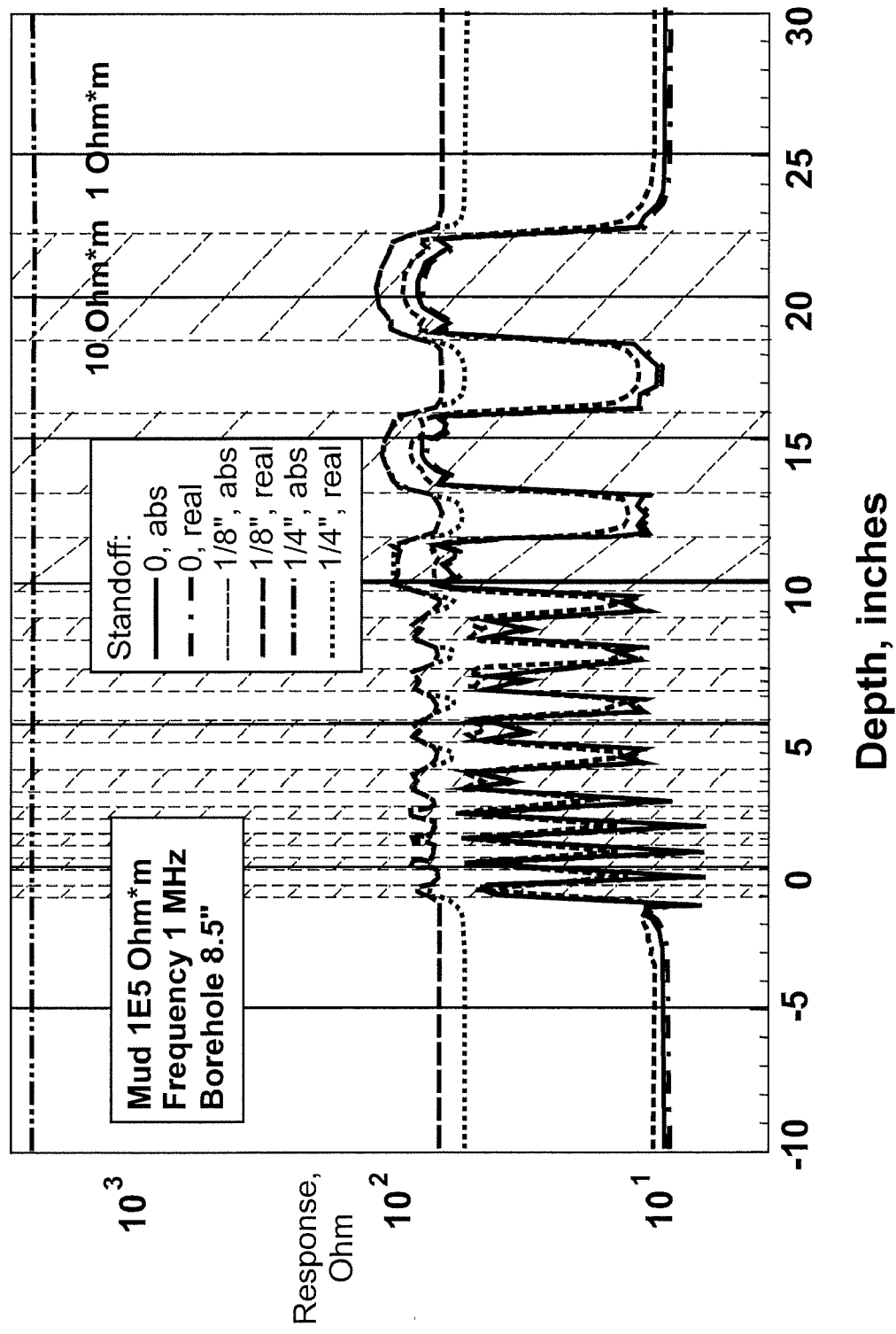
FIGS. 8A-8D, collectively referred to as FIG. 8, present responses from the logging instrument from a numerical simulation with a vertical benchmark and operational frequencies of 1 and 10 MHz.
Figure 8B:
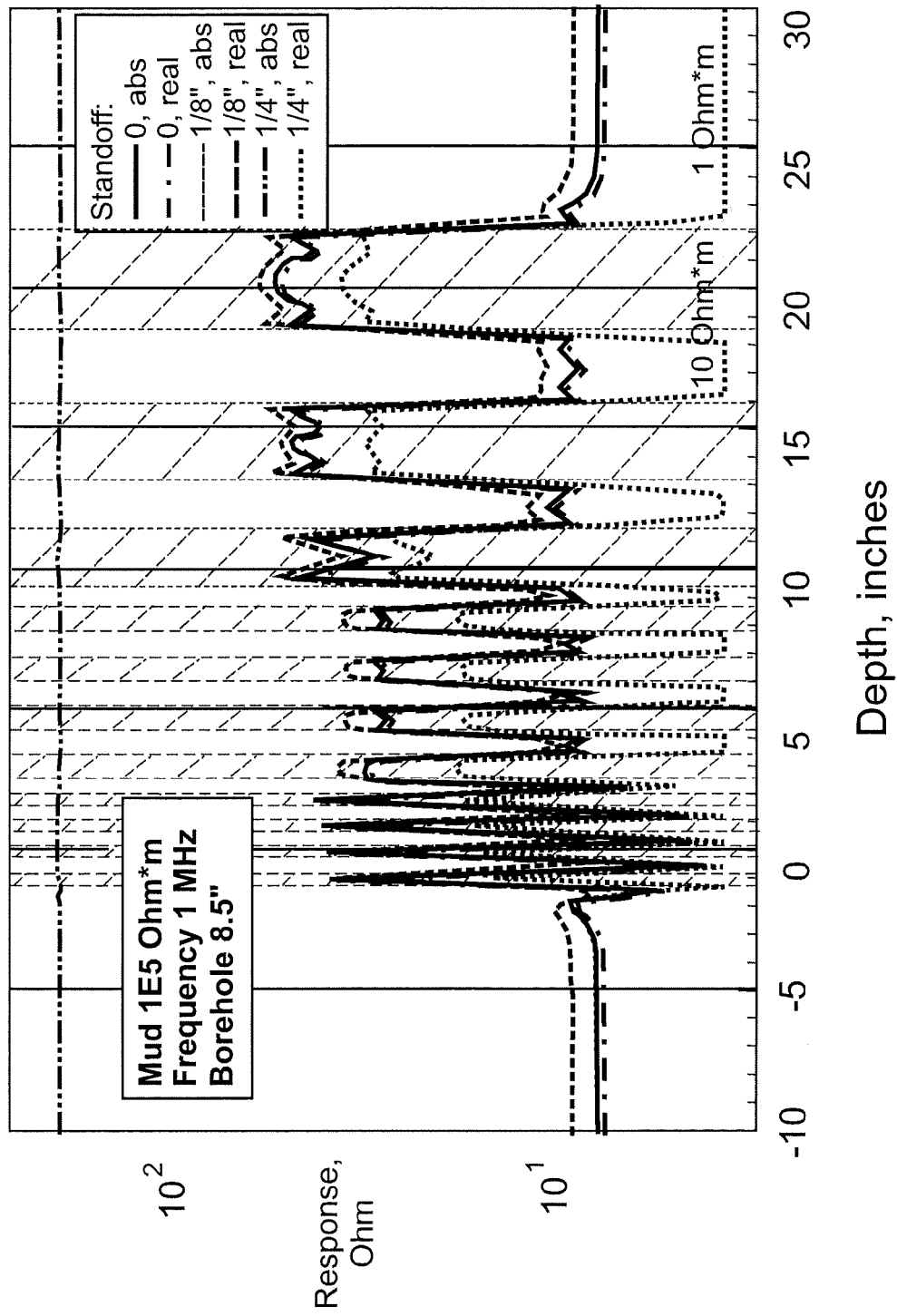
Figure 8C:
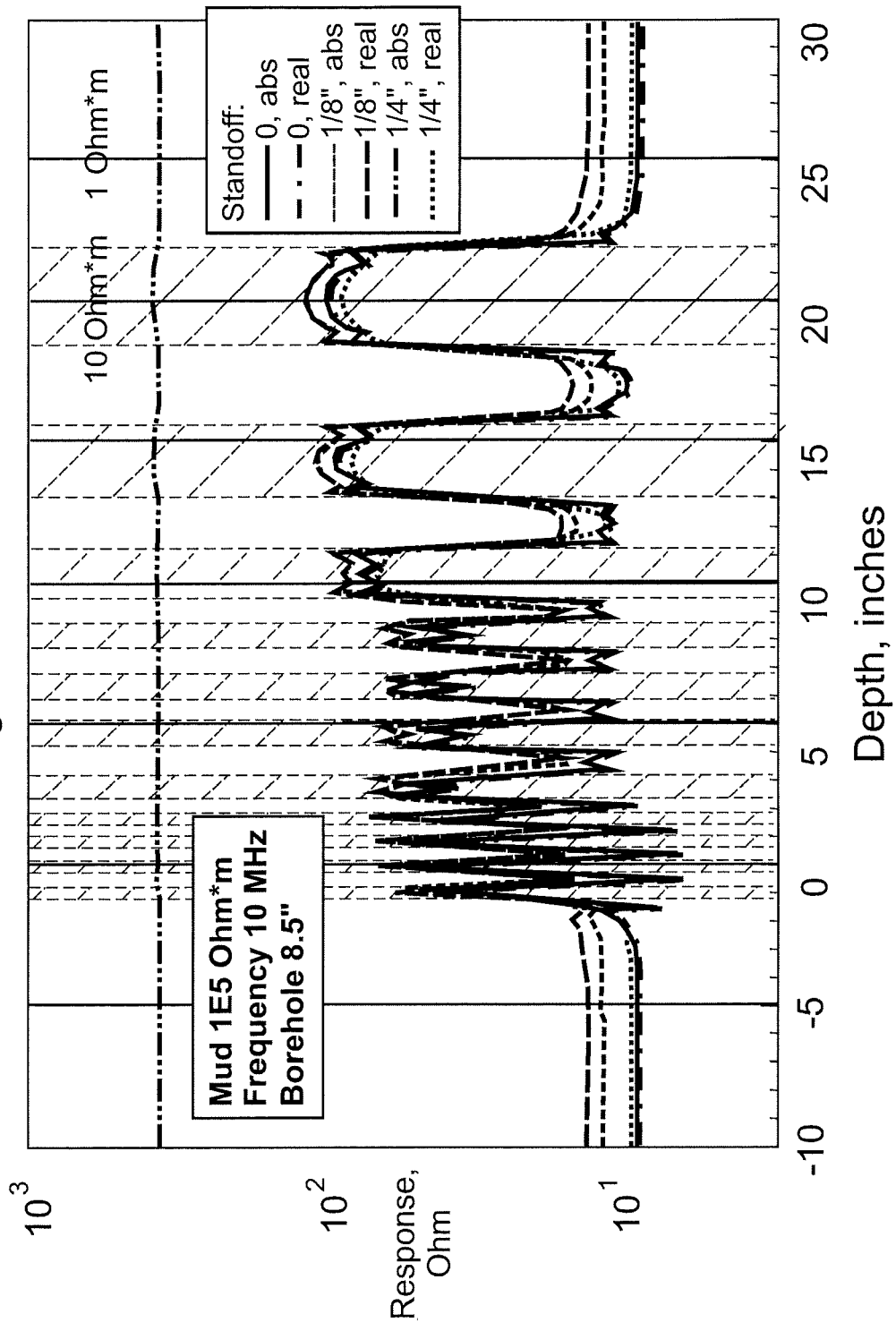
Figure 8D:
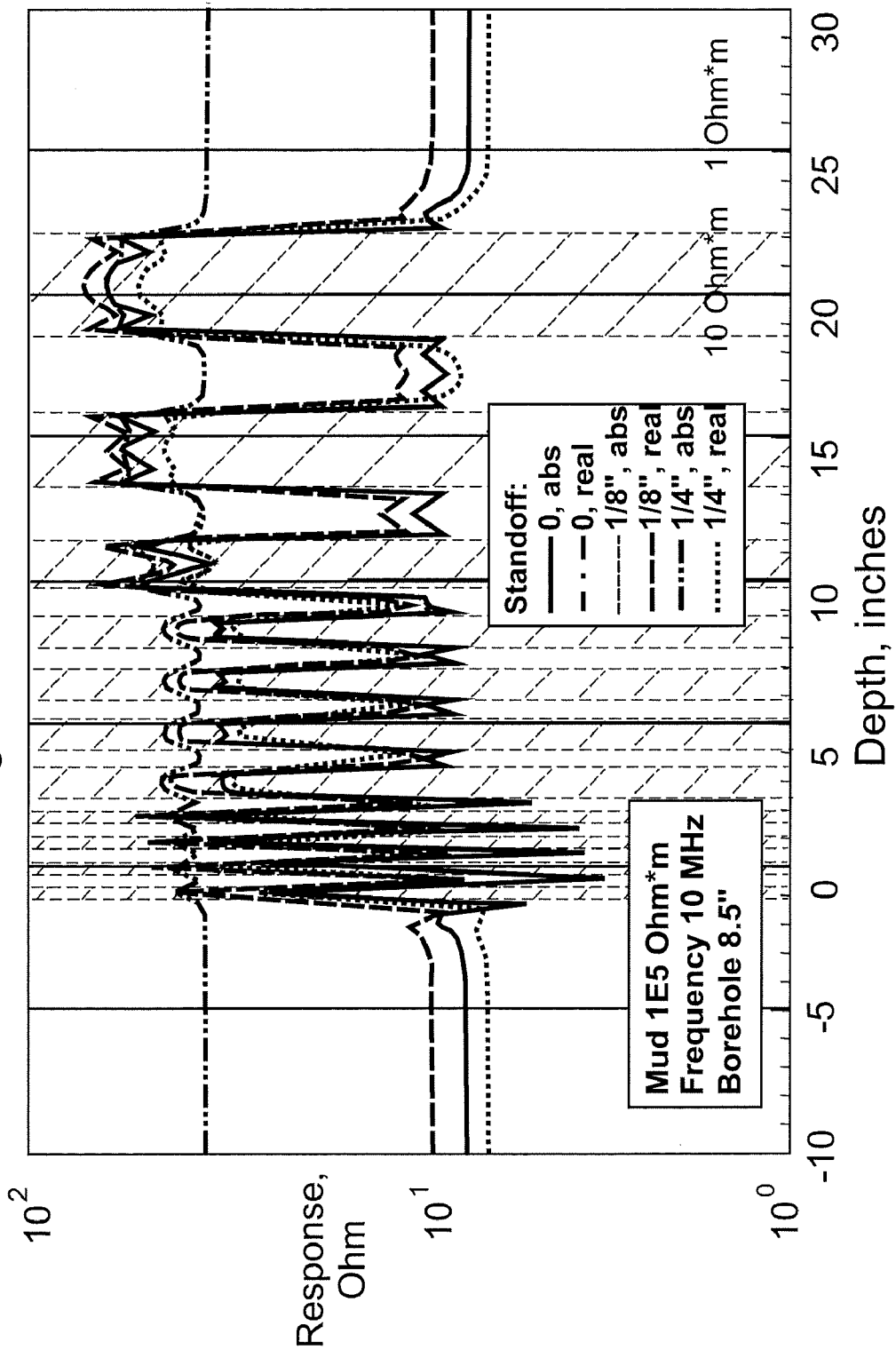

FIG. 7, which includes FIGS. 7A and 7B, presents responses of the instrument 10 for the azimuthal benchmark for an operational frequency of 40 MHz with current injector electrode distances of 1.5 and 2 inches.

FIG. 8, which includes FIGS. 8A-8D, presents responses for the vertical benchmark for operational frequencies of 1 and 10 MHz and current injector electrode distances of 1.5 and 2 inches.

Upon review of the responses presented in FIGS. 5-8, the following observations can be made.

1) The instrument 10 provides high azimuthal resolution.
2) The responses are optimal at zero standoff. The responses, especially the azimuthal responses, are less than optimal as the standoff increases.
3) For the response with the standoff modeled at ¼ inch and the operational frequency modeled at 1 MHz, the substantial elimination of the direct electric field is achieved for the instrument 10 with the distance between current injector electrodes 41 and 42 set at 3 inches. The term "substantial elimination of the direct electric field" relates to the situation where the parasitic imaginary component of the response is much less than the real component of the response, so that the absolute value of the response (i.e., the amplitude—solid lines in FIGS. 5-8) is close to the real component (dotted lines in FIGS. 5-8). For the response with the standoff modeled at ¼ inch and the operational frequency modeled at 10 MHz, the substantial elimination of the direct electric field is achieved for the instrument 10 with the distance between current injector electrodes 41 and 42 set at 2.5 inches. For the response with the standoff modeled at ¼ inch and the operational frequency modeled at 40 MHz, the substantial elimination of the direct electric field is achieved for the instrument 10 with the distance between current injector electrodes 41 and 42 set at 2 inches.
4) The azimuthal resolution is about ⅓ of the distance 54 between the current injector electrodes when measured from outer edge to outer edge as shown in FIG. 4B.

The substantial elimination of the direct electric field is required when only the amplitude of the apparent impedance is measured. If phase sensitive measurements of the first electric current 43, the second electric current 44, and the voltage 48 are performed, then it is possible to separate out the real component of the response and use the real component to determine the apparent impedance. Determination of the parameters of the instrument 10, such as the operational frequency and the distance 54 between the current injector electrodes 41 and 42, can be facilitated upon review of FIGS. 5-8.

For example, for a standoff of ¼ inch and the operational frequency of 1 MHz, the distance 54 between the current injector electrodes 41 and 42 can be two inches. As another example, for the standoff of ¼ inch and the operational frequency of 10 MHz, the distance 54 between the current injector electrodes 41 and 42 can be 1.5 inches.

Referring to FIG. 4A, a parasitic current ($I_p$) 39 is shown flowing from the first current injector electrode 41 to the first metal guard 61 through a mandrel 37. The parasitic current 39 is also shown flowing from the first metal guard 61 through the mandrel 37 to the second current injector electrode 42. The parasitic current ($I_p$) 39 may make for inaccuracies in measuring the first current ($I_{1,i}$) 43 and the second current ($I_{2,i}$) 44. The parasitic current ($I_p$) 39 in general does not depend on the properties of the formation 3. The parasitic current ($I_p$) 39 can be significant because of a high operational frequency and a small distance between the first metal guard 61 and the current injector electrodes 41 and 42. Thus, it is desirable to filter the parasitic current ($I_p$) 39 from the measurements of the first electric current ($I_{1,i}$) 43 and the second electric current ($I_{2,i}$) 44.

Figure 9B:
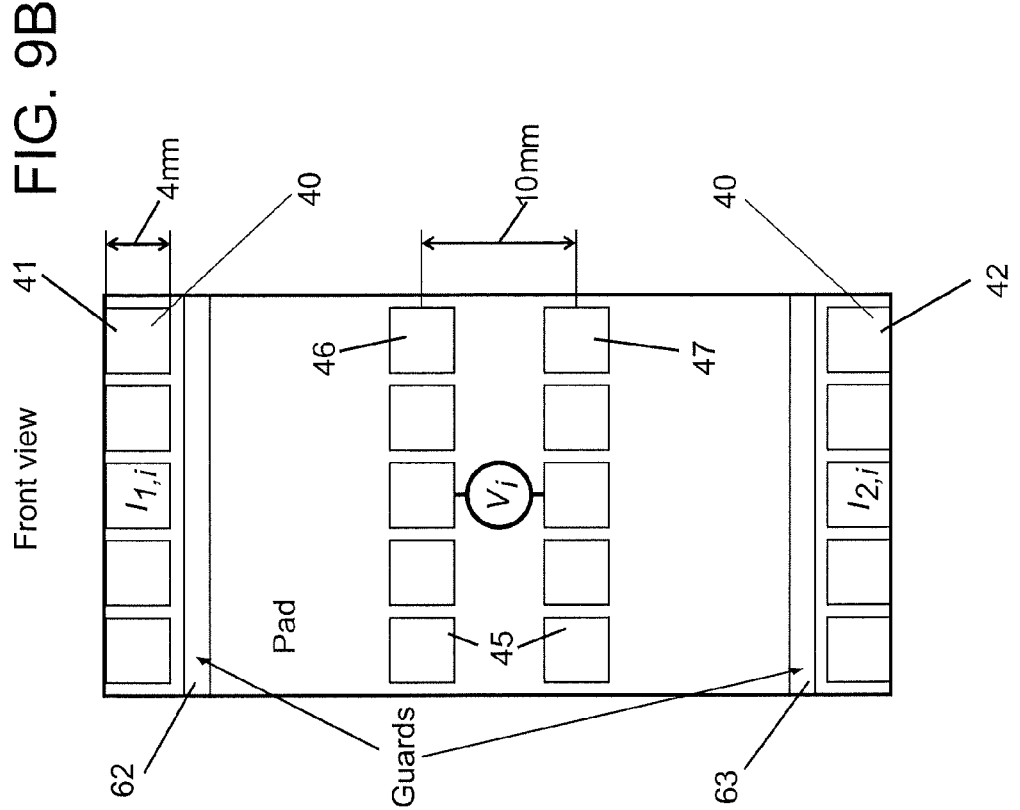
FIG. 9 illustrates an exemplary embodiment of the logging instrument with metal guards.
Figure 9A:
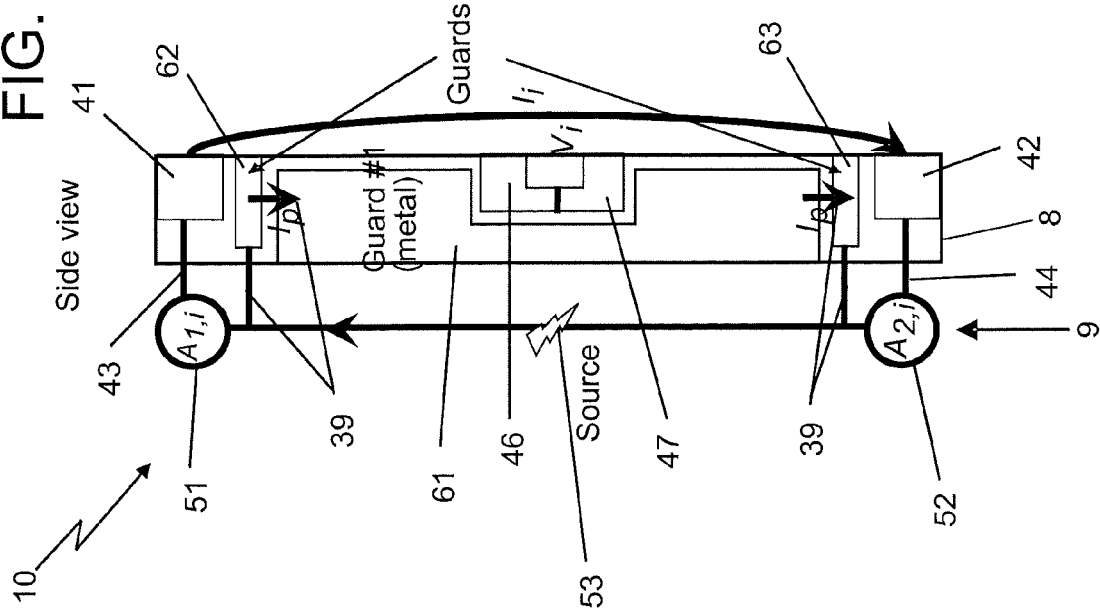

To solve the problem of the parasitic current ($I_p$) 39, a second metal guard and a third metal guard are added to the imaging pad 8. FIG. 9 illustrates an embodiment of the imaging pad 8 with a second metal guard 62 and a third metal guard 63. The second metal guard 62 is equipotential with the first current injector electrode 41. Similarly, the third metal guard 63 is equipotential with the second current injector electrode 42. In the embodiment of FIG. 9, the parasitic current ($I_p$) 39 flows between the second metal guard 62 and the first metal guard 61. The parasitic current ($I_p$) 39 also flows between the first metal guard 61 and the third metal guard 63. Because the parasitic current ($I_p$) 39 now flows through the metal guards 61, 62, and 63, the measurements of the first current ($I_{1,i}$) 43 and the second current ($I_{2,i}$) 44 relate to the current flowing through the formation 3 and layer 4 and not to the parasitic current ($I_p$) 39.

The embodiments of the instrument 10 depicted in FIG. 4 and FIG. 9 use an operating scheme in which electric current is injected in the formation 3 using the current injector electrode pair 40 for i-th measuring set 49 and the voltage ($V_i$) 48 is measured with the associated button-sensor electrode pair 45. The instrument 10 may also be used with a reverse operating scheme. With the reverse operating scheme, the electric current in the formation 3 is injected using electrodes from the button-sensor electrode pair 45 for i-th measuring set 49 and the voltage ($V_i$) 48 is measured using the associated current injector electrode pair 40. Due to the reciprocity principle, the responses from the instrument 10 are the same using either operating scheme.

According to Maxwell's equations, the electric current flowing through the formation 3 between the first current injector electrode 41 and the second current injector electrode 42 creates a magnetic field. If the borehole 2 is vertical, then the electric current is about vertical (Z-axis direction in FIG. 2) and the magnetic field will be azimuthul (i.e., in the X-Y plane in FIG. 2). The magnitude of the azimuthal magnetic field $H_\phi$ can be correlated to the vertical electric current. Thus, the instrument 10 can include a magnetometer to measure $H_\phi$ and provide a response using $H_\phi$.

Figure 10:
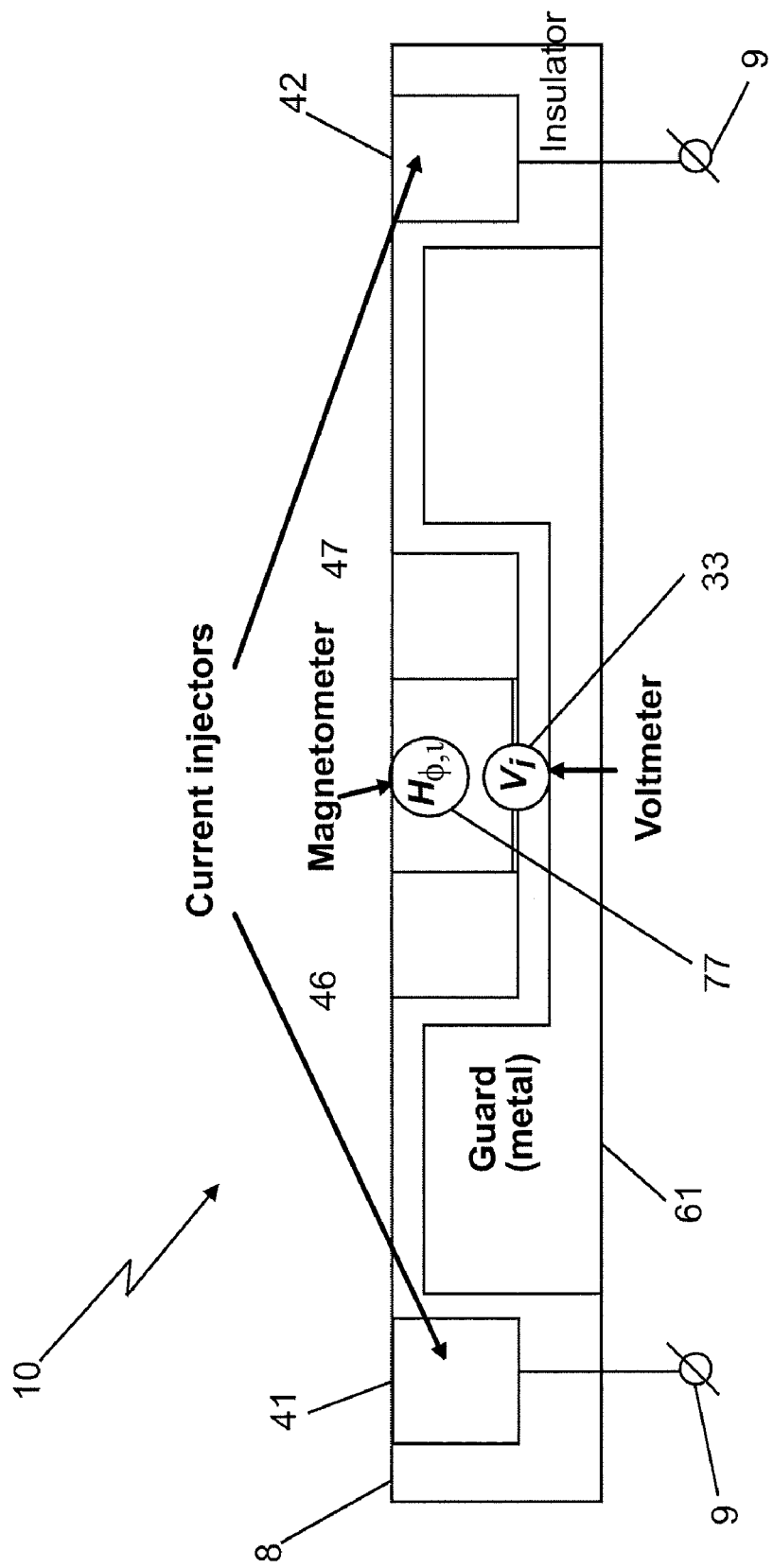
FIG. 10 illustrates an exemplary embodiment of the logging instrument with a magnetometer.

FIG. 10 illustrates a side view of an embodiment of the instrument 10 that includes a magnetometer 77. In the embodiment of FIG. 10, aspects of one measuring set 49 are depicted. The magnetometer 77 is disposed near the button-sensor electrode pair 45. A response for i-th measuring set 49 that includes the magnetometer 77 can be defined as $E_{z,i}/H_{\phi,i}$ where $E_{z,i}$ is the electric field parallel to the borehole 2 (i.e., in Z-axis direction in FIG. 2) at the i-th measuring set 49 and $H_{\phi,i}$ is the magnetic field measured by the magnetometer 77 at the i-th measuring set 49.

Figure 11:
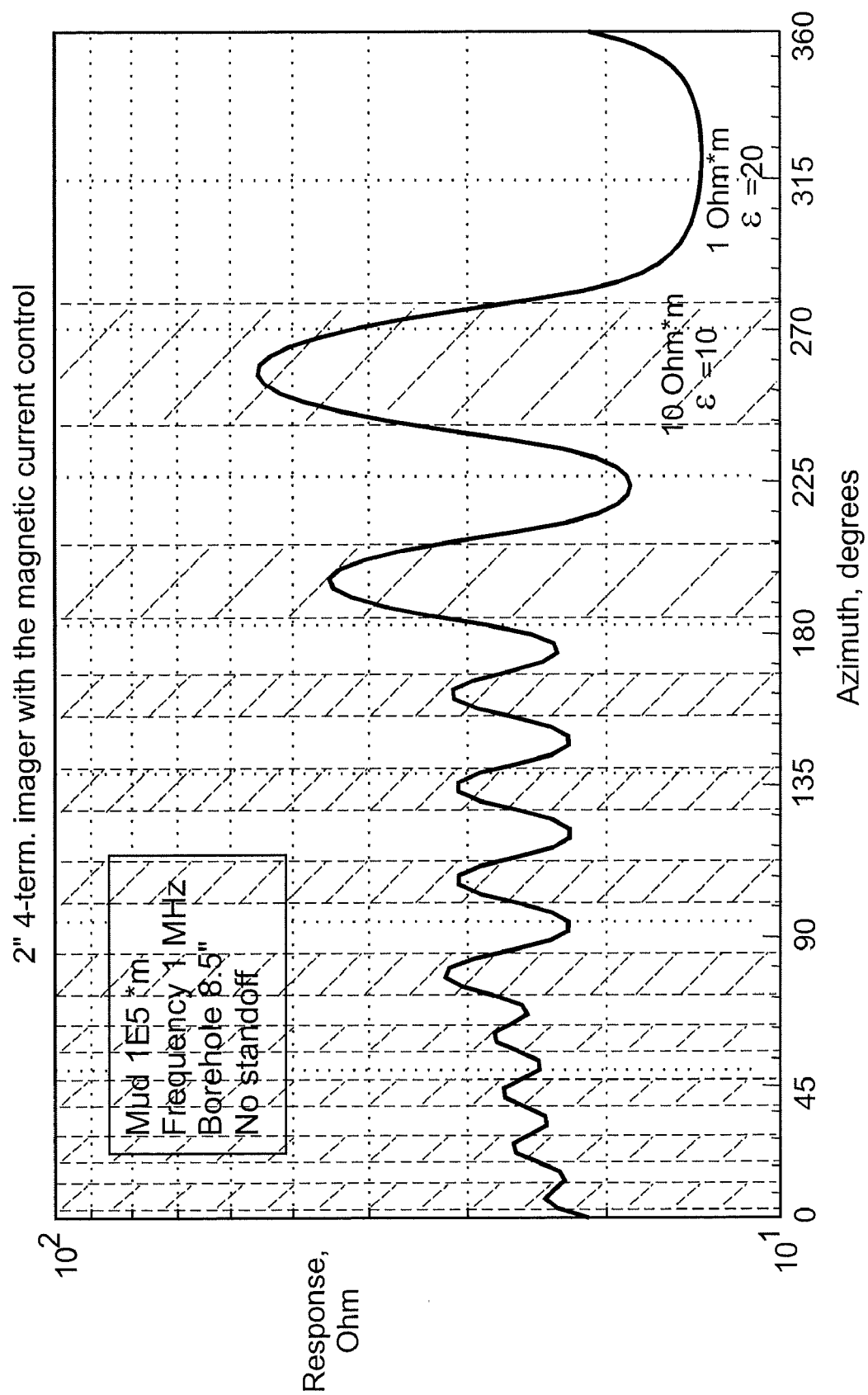
FIG. 11 presents the results of a numerical simulation of the logging instrument with the magnetometer.

A numerical simulation of the instrument 10 depicted in FIG. 10 was performed. The distance 54 between the outer edges of the first current injector electrode 41 and the second current injector electrode 42 was modeled at two inches. The operational frequency was modeled at 1 MHz and the standoff was modeled at zero. The resistivity of the drilling mud was modeled at $10^5$ ohm*m and the diameter of the borehole 2 was modeled at 8.5 inches. The azimuthal benchmark was used in the numerical simulation. FIG. 11 presents the results of the numerical simulation. It can be seen from FIG. 11 that the instrument 10 depicted in FIG. 10 exhibits high azimuthal resolution.

Generally, the well logging instrument 10 includes adaptations as may be necessary to provide for operation during drilling or after a drilling process has been completed.

Referring to FIG. 12, an apparatus for implementing the teachings herein is depicted. In FIG. 12, the apparatus includes a computer 70 coupled to the well logging instrument 10. Typically, the computer 70 includes components as necessary to provide for the real time processing of data from the well logging instrument 10. Exemplary components include, without limitation, at least one processor, storage, memory, input devices, output devices and the like. As these components are known to those skilled in the art, these are not depicted in any detail herein.

Generally, some of the teachings herein are reduced to an algorithm that is stored on machine-readable media. The algorithm is implemented by the computer 70 and provides operators with desired output. The output is typically generated on a real-time basis.

The logging instrument 10 may be used to provide real-time imaging of the formation 3. As used herein, generation of data in "real-time" is taken to mean generation of data at a rate that is useful or adequate for making decisions during or concurrent with processes such as production, experimentation, verification, and other types of surveys or uses as may be opted for by a user or operator. Accordingly, it should be recognized that "real-time" is to be taken in context, and does not necessarily indicate the instantaneous determination of data, or make any other suggestions about the temporal frequency of data collection and determination.

A high degree of quality control over the data may be realized during implementation of the teachings herein. For example, quality control may be achieved through known techniques of iterative processing and data comparison. Accordingly, it is contemplated that additional correction factors and other aspects for real-time processing may be used. Advantageously, the user may apply a desired quality control tolerance to the data, and thus draw a balance between rapidity of determination of the data and a degree of quality in the data.

FIG. 13 presents one example of a method 130 for imaging a subsurface material from the borehole 2. The method 130 calls for placing (step 131) the logging instrument 10 into the borehole 2 traversing the subsurface material. Further, the method 130 calls for performing a measurement (step 132) a property of the subsurface material with each measuring set 49. Generally, the measurement includes the voltage 48, the first electric current 43 and the second electric current 44. Further, the method 130 calls for calculating (step 133) a response for at least some of the measurements. In one embodiment, the response for each measurement set 49 includes the voltage 48 divided by the sum of the first electric current 43 and the second electric current 44. Further, the method 130 calls for processing (step 134) the responses to provide the imaging.

In one embodiment, each measuring set 49 may be operated simultaneously with other measuring sets 49. In one embodiment, each measuring set 49 may be operated sequentially according to a pattern.

In certain embodiments, a string of two or more logging instruments 10 may be used where each logging instrument 10 includes at least one high azimuthal resolution resistivity imaging pad 8. In these embodiments, a response from each logging instrument 10 may be used separately or combined with other responses to form a composite response.

In another embodiment, the logging instrument 10 can include a plurality of imaging pads 8 where each imaging pad 8 includes at least one measuring set 49.

In support of the teachings herein, various analysis components may be used, including digital and/or analog systems. The digital and/or analog systems may be used in the electronic unit 9 used for at least one of recording and processing signals from the imaging pad 8. The electronic unit 9 may be disposed at least one of in the logging instrument 10 and at the surface of the earth. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, pressure retaining component, insulation, actuator, sensor, electrodes, transmitter, receiver, transceiver, antenna, controller, electrical unit or electromechanical unit may be included in support of the various aspects discussed herein or in support of other functions beyond this disclosure.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for imaging a subsurface material traversed by a borehole, the apparatus comprising:
   an imaging pad deployed by a logging instrument, the pad comprising a plurality of measuring sets, each measuring set comprising a first current injector electrode, a second current injector electrode, a pair of sensor electrodes disposed between the first current injector electrode and the second current injector electrode, and an output for coupling to an electronics unit for producing the imaging of the subsurface material;
   wherein the electronics unit provides a response for each measuring set, the response comprising a voltage measured using the pair of sensor electrodes divided by the sum of an electric current in the first current injector electrode and an electric current in the second current injector electrode.

2. The apparatus as in claim 1, wherein the electronics unit comprises an ammeter for measuring electric current in the first current injector electrode and the second current injector electrode.

3. The apparatus as in claim 1, wherein the electronics unit comprises a voltmeter for measuring voltage across the pair of sensor electrodes.

4. The apparatus as in claim 1, wherein a distance between an outer edge of the first current injector electrode and an outer edge of the second current electrode is less than about three inches.

5. The apparatus as in claim 1, wherein a distance between an outer edge of the first current injector electrode and an outer edge of the second current electrode is less than about two inches.

6. The sensor as in claim 1, wherein electric current flowing between the first current injector electrode and the second current injector electrode comprises a frequency greater than about one megahertz.

7. The apparatus as in claim 1, wherein the electronics unit performs a magnitude and phase measurement using each measuring set for a voltage measured using the pair of sensor electrodes, for an electric current in the first current injector electrode, and for an electric current in the second current injector electrode to determine a real component for each of the voltage and the electric currents.

8. The apparatus as in claim 7, wherein the electronic unit provides a response that includes the real component of the voltage divided by the sum of the real component of the electric current in the first current injector electrode and the real component of the electric current in the second current injector electrode.

9. The apparatus as in claim 1, further comprising a metal guard disposed about at least a portion of the pair of sensor electrodes in each measuring set.

10. The apparatus as claim 9, further comprising another metal guard disposed between the first current injector electrode and the metal guard.

11. The apparatus as in claim 9, further comprising another metal guard disposed between the second current injector electrode and the metal guard.

12. The apparatus as in claim 1, wherein the pair of sensor electrodes is used to inject electric current into the subsurface material and the first current injector electrode and the second current injector electrode are used to measure a voltage.

13. The apparatus as in claim 1, wherein the plurality of measuring sets is azimuthally distributed on the pad.

14. An apparatus for imaging a subsurface material traversed by a borehole, the apparatus comprising:
    an imaging pad deployed by a logging instrument, the pad comprising a plurality of measuring sets, each measuring set comprising a first current injector electrode, a second current injector electrode, a pair of sensor electrodes disposed between the first current injector electrode and the second current injector electrode, and an output for coupling to an electronics unit for producing the imaging of the subsurface material; and
    a magnetometer disposed between the first current injector electrode and the second current electrode in at least one measuring set to measure an azimuthal magnetic component $H_\phi$.

15. The apparatus as in claim 14, wherein the electronics unit provides a response comprising the magnitude of an electric field produced by voltage between the first current injector electrode and the second current injector electrode divided by the azimuthal magnetic component $H_\phi$.

16. A method for imaging a subsurface material from a borehole traversing the subsurface material, the method comprising:
    placing a logging instrument in the borehole, the logging instrument comprising an imaging pad that comprises a plurality of measuring sets, each measuring set comprising a first current injector electrode, a second current injector electrode, and a pair of sensor electrodes disposed between the first current injector electrode and the second current injector electrode;
    performing a measurement of a property of the subsurface material with each measuring set;
    calculating a response for at least some of the measurements; and
    processing the responses to provide the imaging;
    wherein the response for each measuring set comprises a voltage measured using the pair of sensor electrodes divided by the sum of an electric current in the first current injector electrode and an electric current in the second current injector electrode.

17. The method as in claim 16, wherein the response for each measuring set comprises the real component of a voltage measured by the pair of sensor electrodes divided by the sum of the real component of an electric current in the first current injector electrode and the real component of an electric current in the second current injector electrode.

18. The method as in claim 16, wherein the plurality of measuring sets is azimuthally distributed on the pad.

19. A method for imaging a subsurface material from a borehole traversing the subsurface material, the method comprising:
    placing a logging instrument in the borehole, the logging instrument comprising an imaging pad that comprises a plurality of measuring sets, each measuring set comprising a first current injector electrode, a second current injector electrode, and a pair of sensor electrodes disposed between the first current injector electrode and the second current injector electrode;
    performing a measurement of a property of the subsurface material with each measuring set;
    calculating a response for at least some of the measurements; and
    processing the responses to provide the imaging;
    wherein each measuring set further comprises a magnetometer disposed between the first current injector electrode and the second current electrode to measure an azimuthal magnetic component $H_\phi$ and the response comprises the magnitude of an electric field produced by voltage between the first current injector electrode and the second current injector electrode divided by the azimuthal magnetic component $H_\phi$.

20. A computer program product stored on machine-readable media, the product comprising machine-executable instructions for imaging a subsurface material traversed by a borehole, the product comprising instructions for:
    performing a measurement of a property of the subsurface material with each measuring set of a logging instrument that comprises an imaging pad comprising a plurality of measuring sets, each measuring set comprising a first current injector electrode, a second current injector electrode, and a sensor electrode pair disposed between the first current injector electrode and the second current injector electrode;
    recording the measurements;
    calculating a response for at least some of the measurements; and
    processing the responses to provide the imaging;
    wherein the response for each measuring set comprises a voltage measured using the pair of sensor electrodes divided by the sum of an electric current in the first current injector electrode and an electric current in the second current injector electrode.

\* \* \* \* \*